(12) United States Patent
Zhou

(10) Patent No.: US 12,335,821 B2
(45) Date of Patent: Jun. 17, 2025

(54) REPORT INFORMATION SENDING METHOD, COMMUNICATION APPARATUS, AND COMMUNICATION SYSTEM

(71) Applicant: HUAWEI TECHNOLOGIES CO., LTD., Shenzhen (CN)

(72) Inventor: Xiaoyun Zhou, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 331 days.

(21) Appl. No.: 17/868,224

(22) Filed: Jul. 19, 2022

(65) Prior Publication Data

US 2022/0353746 A1 Nov. 3, 2022

Related U.S. Application Data

(63) Continuation of application No. PCT/CN2021/073400, filed on Jan. 22, 2021.

(30) Foreign Application Priority Data

Jan. 23, 2020 (CN) .......................... 202010077131.5

(51) Int. Cl.
*H04W 4/00* (2018.01)
*H04L 41/00* (2022.01)
(Continued)

(52) U.S. Cl.
CPC .............. *H04W 4/24* (2013.01); *H04L 41/00* (2013.01); *H04L 41/0894* (2022.05);
(Continued)

(58) Field of Classification Search
None
See application file for complete search history.

(56) References Cited

U.S. PATENT DOCUMENTS

| 2012/0300018 A1* | 11/2012 | Li ....................... H04L 12/1827 348/14.09 |
| 2019/0132251 A1 | 5/2019 | Dao et al. |
| 2019/0253917 A1* | 8/2019 | Dao .................. H04W 28/0268 |

FOREIGN PATENT DOCUMENTS

| CN | 108738071 A | 11/2018 |
| CN | 110049517 A | 7/2019 |

(Continued)

OTHER PUBLICATIONS

Catt, "PDU Session Modification procedures", SA WG2 Meeting #118-BIS S2-170253, Jan. 16-20, 2017 Spokane, WA, USA, Total 4 Pages.

(Continued)

*Primary Examiner* — Zewdu A Beyen
(74) *Attorney, Agent, or Firm* — HAUPTMAN HAM, LLP

(57) ABSTRACT

In a report information sending method, a first session management network element receives first report information, which includes first indication information and an identifier of a first alternative QoS profile, from a user plane network element. The first indication information indicates that a QoS requirement of a first QoS flow cannot be guaranteed. The first session management network element sends second report information, which includes second indication information and an identifier of a first alternative service requirement, to an application function network element. The identifier of the first alternative service requirement corresponds to the identifier of the first alternative QoS profile. The second indication information indicates that a QoS requirement of a first service data flow cannot be guaranteed. The first QoS flow is configured to transmit the
(Continued)

first service data flow, which is a service data flow of an application corresponding to the application function network element.

21 Claims, 10 Drawing Sheets

(51) Int. Cl.
*H04L 41/0894* (2022.01)
*H04W 4/24* (2018.01)
*H04W 28/10* (2009.01)
*H04W 28/24* (2009.01)
*H04W 48/16* (2009.01)

(52) U.S. Cl.
CPC .......... *H04W 28/10* (2013.01); *H04W 28/24* (2013.01); *H04W 48/16* (2013.01)

(56) References Cited

FOREIGN PATENT DOCUMENTS

| CN | 110519802 A | 11/2019 |
| CN | 110603842 A | 12/2019 |
| CN | 110691370 A | 1/2020 |
| WO | 2019085728 A1 | 5/2019 |

OTHER PUBLICATIONS

Catt,"Solution for efficient network information provisioning to local applications", 3GPP TSG-SA WG2 Meeting #136AH S2-2000810, Jan. 13-17, 2020, Incheon, Korea, Total 3 Pages.

Chinese Office Action issued in corresponding Chinese Application No. 202010077131.5, dated Mar. 1, 2022, pp. 1-7.

International Search Report issued in corresponding International Application No. PCT/CN2021/073400, dated Apr. 26, 2021, pp. 1-9.

3GPP TS 23.501 V16.3.0 (Dec. 2019), 3rd Generation Partnership Project; Technical Specification Group Services and System Aspects;System architecture for the 5G System (5GS);Stage 2 (Release 16), Total 417 Pages.

3GPP TS 23.503 v16.3.0 (Dec. 2019), 3rd Generation Partnership Project; TechnicalSpecification Group Services and System Aspects; Policy and Charging Control Framework for the 5G System;Stage 2 (Release 16), Total 108 Pages.

Extended European Search Report issued in corresponding European Application No. 21744326.6, dated May 3, 2023, pp. 1-12.

\* cited by examiner

REPORT INFORMATION SENDING METHOD, COMMUNICATION APPARATUS, AND COMMUNICATION SYSTEM

CROSS-REFERENCE TO RELATED APPLICATIONS

This application is a continuation of International Application No. PCT/CN2021/073400, filed on Jan. 22, 2021, which claims priority to Chinese Patent Application No. 202010077131.5, filed on Jan. 23, 2020. The disclosures of the aforementioned applications are hereby incorporated by reference in their entireties.

TECHNICAL FIELD

This application relates to the field of communication technologies, and in particular, to a report information sending method, a communication apparatus, and a communication system.

BACKGROUND

In a fifth generation mobile communication system (5th generation wireless systems, 5G), user equipment (user equipment, UE) establishes a protocol data unit (protocol data unit, PDU) session after accessing a network, and accesses an external data network (data network, DN) by using the PDU session, to interact with an application server deployed in the DN. Based on different DNs accessed by a user, a session management function (session management function, SMF) may select user plane functions (user plane function, UPF) for accessing the DNs, and access application servers by using the UPFs. Application servers of one application can be deployed at a plurality of locations. The SMF can select, based on accessing location of the UE, UPFs that are close to the UE and that can support the UE in accessing the DNs, to reduce route recurvation and a network delay. Generally, the application servers may be deployed in a mobile edge computing (mobile edge compute, MEC) environment. The application needs to sense quality of service (quality of service, QoS) information of a transmission path of a service data flow, to perform corresponding adjustment at an application layer.

Currently, the application may obtain the QoS information in the following manner An application function (application function, AF) sends a QoS control notification (control notification) request to a network exposure function (network exposure function, NEF), where the QoS control notification request is used to request to obtain the QoS information of transmission of the service data flow. The NEF sends the QoS control notification request to a policy control function (policy control function, PCF). After receiving the QoS control notification request, the PCF formulates a corresponding QoS policy, and sends the QoS policy to the SMF. The SMF executes the QoS policy, and generates an execution result. The SMF sends the execution result to a radio access network (radio access network, RAN) by using an access and mobility management function (access and mobility management function, AMF). The RAN may determine a QoS flow (flow) based on the execution result, to generate the QoS information. For example, when the RAN determines that a guaranteed flow bit rate (guaranteed flow bit rate, GFBR) of the QoS flow cannot be guaranteed, the RAN sends, through the following path, a notification indicating that the GFBR cannot be guaranteed: the RAN→the AMF→the SMF→the PCF→the NEF→the AF. Finally, the AF can receive the notification indicating that the GFBR cannot be guaranteed. After receiving the notification, the AF may perform corresponding adjustment at the application layer.

It can be learned from the descriptions of the manner of obtaining the QoS information that communication between the RAN and the AF can be completed only through the complex path "the RAN→the AMF→the SMF→the PCF→the NEF→the AF". The path is excessively long. For a service with high time sensitivity, timeliness of the QoS information is low. Consequently, a large delay occurs when the AF performs adjustment at the application layer.

SUMMARY

Embodiments of this application provide a report information sending method, a communication apparatus, and a communication system, to shorten a transmission path for reporting information, and reduce a processing delay of an application function network element.

To resolve the foregoing technical problems, embodiments of this application provide the following technical solutions.

According to a first aspect, at least one embodiment of this application provides a report information sending method, including: A first session management network element receives first report information from a user plane network element, where the first report information includes first indication information and an identifier of a first alternative quality of service QoS profile, and the first indication information indicates that a QoS requirement of a first quality of service flow QoS flow cannot be guaranteed. The first session management network element sends second report information to an application function network element, where the second report information includes second indication information and an identifier of a first alternative service requirement, the identifier of the first alternative service requirement corresponds to the identifier of the first alternative QoS profile, the second indication information indicates that a QoS requirement of a first service data flow cannot be guaranteed, the first QoS flow is used to transmit the first service data flow, and the first service data flow is a service data flow of an application corresponding to the application function network element. In the foregoing solution, because the first session management network element may receive the first report information from the user plane network element, and the first report information carries the first indication information and the identifier of the first QoS profile, the first session management network element may obtain the second indication information based on the first indication information, and may further determine the identifier of the first alternative service requirement based on the identifier of the first alternative QoS profile. Therefore, the first session management network element may generate the second report information. The first session management network element sends the second report information to the application function management network element, and the second indication information in the second report information indicates that the QoS requirement of the first service data flow cannot be guaranteed. In at least one embodiment of this application, based on a path "the user plane network element—the first session management network element—the application function network element", the application function network element can determine that the QoS requirement of the first service data flow cannot be guaranteed. In addition, the second report information further carries the identifier of the first alternative service requirement, so that the application function network element can further determine an alternative service requirement. In this way, the application function network element quickly performs adjustment at an application layer based on the first alternative service requirement when determining that the QoS requirement of the first service data flow cannot be guaranteed. Therefore, a path for indicating that the QoS requirement of the first service data flow cannot be guaranteed is greatly shortened. For a service with high time sensitivity, timeliness of the second report information is high, and a delay that occurs when the application function network element performs adjustment at the application layer is reduced.

In a possible implementation, the second indication information is determined based on the first indication information. In the foregoing solution, the second indication information is generated based on indication content carried in the first indication information. The first indication information indicates that the QoS requirement of the first QoS flow cannot be guaranteed. The first session management network element determines, because the QoS requirement of the first QoS flow cannot be guaranteed, that the QoS requirement of the first service data flow transmitted by using the first QoS flow cannot be guaranteed, and includes, in the second indication information, information indicating that the QoS requirement of the first service data flow cannot be guaranteed.

In a possible implementation, when the first session management network element is an intermediate session management network element, before the first session management network element receives the first report information from the user plane network element, the method further includes: The first session management network element receives a first policy from a second session management network element, where the first policy includes an identifier of the first QoS flow, first QoS notification control indication information, at least one alternative QoS profile, information about a notification endpoint of the application function network element, and an identifier that is of at least one alternative service requirement and that corresponds to an identifier of the at least one alternative QoS profile, the at least one alternative QoS profile includes the first alternative QoS profile, the identifier of the at least one alternative service requirement includes the identifier of the first alternative service requirement, and the first QoS notification control indication information indicates to send indication information indicating whether the QoS requirement of the first QoS flow can be guaranteed. The first session management network element determines a second policy according to the first policy, and sends the second policy to a first access network element, where the second policy includes the identifier of the first QoS flow, second QoS notification control indication information, and the at least one alternative QoS profile, and the second QoS notification control indication information is determined based on the first QoS notification control indication information. In the foregoing solution, the first access network element may communicate with the first session management network element, and receive the second policy from the first session management network element. The first access network element parses the second policy. The first access network element may obtain the identifier of the first QoS flow, the second QoS notification control indication information, and the at least one alternative QoS profile. The second QoS notification control indication information indicates to send indication information indicating that the QoS requirement of the first QoS flow cannot be guaranteed. For example, the second QoS notification control indication information indicates the first access network element to send the first indication information to the user plane network element, so that the user plane network element can generate the first report information based on the first indication information, and send the first report information to the first session management network element, so that the first report information is quickly reported.

In a possible implementation, when the first session management network element is an intermediate session management network element, before the first session management network element receives the first report information from the user plane network element, the method further includes: The first session management network element receives a first policy from a second session management network element, where the first policy includes an identifier of the first QoS flow, first QoS notification control indication information, at least one alternative QoS profile, information about a notification endpoint of the application function network element, and an identifier that is of at least one alternative service requirement and that corresponds to an identifier of the at least one alternative QoS profile, the at least one alternative QoS profile includes the first alternative QoS profile, the identifier of the at least one alternative service requirement includes the identifier of the first alternative service requirement, and the first QoS notification control indication information indicates to send indication information indicating whether the QoS requirement of the first QoS flow can be guaranteed. The first session management network element determines a third policy according to the first policy, and sends the third policy to the user plane network element, where the third policy is used to indicate the user plane network element to send the indication information indicating whether the QoS requirement of the first QoS flow can be guaranteed. In the foregoing solution, the user plane network element may communicate with the first session management network element, and receive the third policy from the first session management network element. The user plane network element parses the third policy. The user plane network element needs to send, according to the indication of the third policy, the indication information indicating whether the QoS requirement of the first QoS flow can be guaranteed. For example, when determining that the QoS requirement of the first QoS flow cannot be guaranteed, the user plane network element sends the foregoing first report information carrying the first indication information, so that the first report information is quickly reported.

In a possible implementation, that the first session management network element sends second report information to an application function network element includes: When the first indication information includes the identifier of the first QoS flow, the first session management network element determines the notification endpoint of the application function network element based on the identifier of the first QoS flow, and sends the second report information to the application function network element by using the notification endpoint of the application function network element. In the foregoing solution, after the first session management network element receives the first policy, the first session management network element parses the first policy to obtain the identifier of the first QoS flow and the information about the notification endpoint of the application function network element. The first session management network element determines, based on the identifier that is of the first QoS flow and that is carried in the first indication information, the notification endpoint that is of the application function network element and that is carried in the first policy, and sends the second report information to the notification endpoint, so that the application function network element can receive the second report information from the first session management network element. In at least one embodiment of this application, the first session management network element may send the second report information to the application function network element by using the notification endpoint of the application function network element, so that communication between the first session management network element and the application function network element is implemented. In this way, the application function network element can quickly receive the second report information, and perform adjustment at the application layer based on the second report information, so that a transmission delay of the second report information is reduced.

In a possible implementation, when the first session management network element is an intermediate session management network element, before the first session management network element receives the first report information from the user plane network element, the method further includes: The first session management network element receives a first policy from a second session management network element, where the first policy includes an identifier of the first QoS flow, first QoS notification control indication information, at least one alternative QoS profile, information about a notification endpoint of a local network exposure function network element, and an identifier that is of at least one alternative service requirement and that corresponds to an identifier of the at least one alternative QoS profile, the at least one alternative QoS profile includes the first alternative QoS profile, the identifier of the at least one alternative service requirement includes the identifier of the first alternative service requirement, and the first QoS notification control indication information indicates to send indication information indicating whether the QoS requirement of the first QoS flow can be guaranteed. The first session management network element determines a second policy according to the first policy, and sends the second policy to a first access network element, where the second policy includes the identifier of the first QoS flow, second QoS notification control indication information, and the at least one alternative QoS profile, and the second QoS notification control indication information is determined based on the first QoS notification control indication information. In the foregoing solution, the first access network element may communicate with the first session management network element, and receive the second policy from the first session management network element. The first access network element parses the second policy. The first access network element may obtain the identifier of the first QoS flow, the second QoS notification control indication information, and the at least one alternative QoS profile. The second QoS notification control indication information indicates to send indication information indicating that the QoS requirement of the first QoS flow cannot be guaranteed. For example, the second QoS notification control indication information indicates the first access network element to send the first indication information to the user plane network element, so that the user plane network element can generate the first report information based on the first indication information, and send the first report information to the first session management network element, so that the first report information is quickly reported.

In a possible implementation, when the first session management network element is an intermediate session management network element, before the first session management network element receives the first report information from the user plane network element, the method further includes: The first session management network element receives a first policy from a second session management network element, where the first policy includes an identifier of the first QoS flow, first QoS notification control indication information, at least one alternative QoS profile, information about a notification endpoint of a local network exposure function network element, and an identifier that is of at least one alternative service requirement and that corresponds to an identifier of the at least one alternative QoS profile, the at least one alternative QoS profile includes the first alternative QoS profile, the identifier of the at least one alternative service requirement includes the identifier of the first alternative service requirement, and the first QoS notification control indication information indicates to send indication information indicating whether the QoS requirement of the first QoS flow can be guaranteed. The first session management network element determines a third policy according to the first policy, and sends the third policy to the user plane network element, where the third policy is used to indicate the user plane network element to send the indication information indicating whether the QoS requirement of the first QoS flow can be guaranteed. In the foregoing solution, the user plane network element may communicate with the first session management network element, and receive the third policy from the first session management network element. The user plane network element parses the third policy. The user plane network element needs to send, according to the indication of the third policy, the indication information indicating whether the QoS requirement of the first QoS flow can be guaranteed. For example, when determining that the QoS requirement of the first QoS flow cannot be guaranteed, the user plane network element sends the foregoing first report information carrying the first indication information, so that the first report information is quickly reported.

In a possible implementation, that the first session management network element sends second report information to an application function network element includes: When the first indication information includes the identifier of the first QoS flow, the first session management network element determines the notification endpoint of the local network exposure function network element based on the identifier of the first QoS flow, and sends the second report information to the local network exposure function network element by using the notification endpoint of the local network exposure function network element, where the second report information is sent by the local network exposure function network element to the application function network element. In the foregoing solution, after the first session management network element receives the first policy, the first session management network element parses the first policy to obtain the identifier of the first QoS flow and the information about the notification endpoint of the local network exposure function network element. The first session management network element determines, based on the identifier that is of the first QoS flow and that is carried in the first indication information, the notification endpoint that is of the local network exposure function network element and that is carried in the first policy, and sends the second report information to the notification endpoint, so that the local network exposure function network element can receive the second report information from the first session management network element, and the local network exposure function network element sends the second report information to the application function network element. In at least one embodiment of this application, the first session management network element may send the second report information to the local network exposure function network element by using the notification endpoint of the local network exposure function network element, and then the local network exposure function network element sends the second report information to the application function network element, so that communication between the first session management network element and the application function network element is implemented. In this way, the application function network element can quickly receive the second report information, and perform adjustment at the application layer based on the second report information, so that a transmission delay of the second report information is reduced.

In a possible implementation, the first policy is generated by the second session management network element according to a fourth policy from a policy control network element, the fourth policy includes at least one alternative QoS parameter set and the identifier that is of the at least one alternative service requirement and that corresponds to an identifier of the at least one alternative QoS parameter set, the at least one alternative QoS parameter set is used by the second session management network element to determine the at least one alternative QoS profile, the identifier that is of the at least one alternative service requirement and that corresponds to the identifier of the at least one alternative QoS parameter set is used by the second session management network element to determine the identifier that is of the at least one alternative service requirement and that corresponds to the identifier of the at least one alternative QoS profile, and the identifier of the at least one alternative service requirement includes the identifier of the first alternative service requirement. In the foregoing solution, the second session management network element receives the fourth policy from the policy control network element. The second session management network element parses the fourth policy, and determines the at least one alternative QoS parameter set and the identifier that is of the at least one alternative service requirement and that corresponds to the identifier of the at least one alternative QoS parameter set. The at least one alternative QoS parameter set is used to determine the at least one alternative QoS profile. The second session management network element generates the first policy. The first policy generated by the second session management network element includes the identifier of the first QoS flow, the first QoS notification control indication information, the at least one alternative QoS profile, the information about the notification endpoint of the application function network element, and the identifier that is of the at least one alternative service requirement and that corresponds to the identifier of the at least one alternative QoS profile. The second session management network element may generate the first policy by interacting with the policy control network element, so that the second session management network element can send the first policy to the first session management network element.

In a possible implementation, before the first session management network element receives the first report information from the user plane network element, the method further includes: The first session management network element receives a fourth policy from a policy control network element, where the fourth policy includes at least one alternative QoS parameter set and an identifier that is of at least one alternative service requirement and that corresponds to an identifier of the at least one alternative QoS parameter set, and the identifier of the at least one alternative service requirement includes the identifier of the first alternative service requirement. The first session management network element determines at least one alternative QoS profile based on the at least one alternative QoS parameter set, and determining the identifier that is of the at least one alternative service requirement and that corresponds to an identifier of the at least one alternative QoS profile. In the foregoing solution, the first session management network element receives the fourth policy from the policy control network element. The first session management network element parses the fourth policy, and determines the at least one alternative QoS parameter set and the identifier that is of the at least one alternative service requirement and that corresponds to the identifier of the at least one alternative QoS parameter set. The at least one alternative QoS parameter set is used to determine the at least one alternative QoS profile. The first session management network element generates a first policy. The first policy generated by the first session management network element includes an identifier of the first QoS flow, first QoS notification control indication information, the at least one alternative QoS profile, information about a notification endpoint of the application function network element, and the identifier that is of the at least one alternative service requirement and that corresponds to the identifier of the at least one alternative QoS profile. The first session management network element may generate the first policy by interacting with the policy control network element.

In a possible implementation, after the first session management network element sends the second report information to the application function network element, the method further includes: When a terminal device is handed over from the first access network element to a second access network element, the first session management network element receives, from the second access network element, identification information of a QoS flow, where the identification information of the QoS flow includes the identifier of the first QoS flow. The first session management network element sends third report information to the application function network element, where the third report information includes third indication information, and the third indication information indicates that the QoS requirement of the first service data flow cannot be guaranteed. In the foregoing solution, when the terminal device is handed over from the first access network element to the second access network element, the second access network element may further send the identification information of the QoS flow to the first session management network element. For example, an N2 interface is established between the second access network element and an AMF, an N11 interface is established between the AMF and the first session management network element, and the first session management network element receives, from the second access network element, the identification information of the QoS flow, where the identification information of the QoS flow includes the identifier of the first QoS flow, and the first QoS flow is used to transmit the first service data flow. The first session management network element may send the third report information to the application function network element, where the third report information includes the third indication information, and the third indication information indicates that the QoS requirement of the first service data flow cannot be guaranteed. In at least one embodiment of this application, when the terminal device is handed over, the application function network element may alternatively receive the third report information from the first session management network element, and perform adjustment at the application layer based on the third report information, so that a transmission delay of the third report information is reduced.

In a possible implementation, the method further includes: The first session management network element receives, from the second access network element, an identifier of a second alternative QoS profile corresponding to the first QoS flow, where the third report information further includes an identifier of a second alternative service requirement, and the identifier of the second alternative service requirement corresponds to the identifier of the second alternative QoS profile. In the foregoing solution, when the QoS requirement of the first QoS flow cannot be guaranteed, the second access network element may further send, to the first session management network element, the identifier of the second alternative QoS profile corresponding to the first QoS flow. The second alternative QoS profile is also an alternative QoS profile that satisfies the QoS requirement of the first QoS flow. In this case, the first session management network element may further determine the second alternative QoS profile that satisfies the QoS requirement of the first QoS flow, and the first session management network element may determine, based on a correspondence between an alternative QoS profile and an alternative service requirement, the identifier that is of the second alternative service requirement and that corresponds to the identifier of the second alternative QoS profile. The first session management network element sends the third report information to the application function network element. In addition to including the third indication information, the third report information further includes the identifier of the second alternative service requirement, so that the application function network element can obtain the second alternative QoS profile that satisfies the QoS requirement of the first QoS flow, and a report indication problem that occurs when there are a plurality of alternative QoS profiles is resolved.

In a possible implementation, the second report information further includes identification information of the first service data flow. In the foregoing solution, the application function network element may receive the second report information from the first session management network element. If the application function network element provides description information of a plurality of service data flows, for example, when there is an indication indicating whether the QoS requirement of the first service data flow and a QoS requirement of a second service data flow can be guaranteed, the second report information sent by the first session management network element needs to carry the identification information of the first service data flow and identification information of the second service data flow. In at least one embodiment of this application, the report information sent by the first session management network element to the application function network element carries the identification information of the service data flow, so that an indication problem of indicating, when there are the plurality of service data flows, whether a QoS requirement of each service flow can be guaranteed is resolved.

In a possible implementation, the third report information further includes the identification information of the first service data flow. In the foregoing solution, the application function network element may receive the third report information from the first session management network element. If the application function network element provides the description information of the plurality of service data flows, for example, when there is the indication indicating whether the QoS requirement of the first service data flow and the QoS requirement of the second service data flow can be guaranteed, the third report information sent by the first session management network element needs to carry the identification information of the first service data flow and the identification information of the second service data flow. In at least one embodiment of this application, the report information sent by the first session management network element to the application function network element carries the identification information of the service data flow, so that the indication problem of indicating, when there are the plurality of service data flows, whether the QoS requirement of each service flow can be guaranteed is resolved.

According to a second aspect, at least one embodiment of this application further provides a report information sending method, including: A user plane network element sends first report information to a first session management network element, where the first report information includes first indication information and an identifier of a first alternative quality of service QoS profile, and the first indication information indicates that a QoS requirement of a first quality of service flow QoS flow cannot be guaranteed. The first session management network element receives the first report information from the user plane network element. The first session management network element sends second report information to an application function network element, where the second report information includes second indication information and an identifier of a first alternative service requirement, the identifier of the first alternative service requirement corresponds to the identifier of the first alternative QoS profile, the second indication information indicates that a QoS requirement of a first service data flow cannot be guaranteed, the first QoS flow is used to transmit the first service data flow, and the first service data flow is a service data flow of an application corresponding to the application function network element. The application function network element receives the second report information sent by the first session management network element. In the foregoing solution, because the first session management network element may receive the first report information from the user plane network element, and the first report information carries the first indication information and the identifier of the first QoS profile, the first session management network element may obtain the second indication information based on the first indication information, and may further determine the identifier of the first alternative service requirement based on the identifier of the first alternative QoS profile. Therefore, the first session management network element may generate the second report information. The first session management network element sends the second report information to the application function management network element, and the second indication information in the second report information indicates that the QoS requirement of the first service data flow cannot be guaranteed. In at least one embodiment of this application, based on a path "the user plane network element—the first session management network element—the application function network element", the application function network element can determine that the QoS requirement of the first service data flow cannot be guaranteed. In addition, the second report information further carries the identifier of the first alternative service requirement, so that the application function network element can further determine an alternative service requirement. In this way, the application function network element quickly performs adjustment at an application layer based on the first alternative service requirement when determining that the QoS requirement of the first service data flow cannot be guaranteed. Therefore, a path for indicating that the QoS requirement of the first service data flow cannot be guaranteed is greatly shortened. For a service with high time sensitivity, timeliness of the second report information is high, and a delay that occurs when the application function network element performs adjustment at the application layer is reduced.

In a possible implementation, the second indication information is determined based on the first indication information. In the foregoing solution, the second indication information is generated based on indication content carried in the first indication information. The first indication information indicates that the QoS requirement of the first QoS flow cannot be guaranteed. The first session management network element determines, because the QoS requirement of the first QoS flow cannot be guaranteed, that the QoS requirement of the first service data flow transmitted by using the first QoS flow cannot be guaranteed, and includes, in the second indication information, information indicating that the QoS requirement of the first service data flow cannot be guaranteed.

In a possible implementation, when the first session management network element is an intermediate session management network element, before the first session management network element receives the first report information from the user plane network element, the method further includes: A second session management network element sends a first policy to the first session management network element, where the first policy includes an identifier of the first QoS flow, first QoS notification control indication information, at least one alternative QoS profile, information about a notification endpoint of the application function network element, and an identifier that is of at least one alternative service requirement and that corresponds to an identifier of the at least one alternative QoS profile, the at least one alternative QoS profile includes the first alternative QoS profile, the identifier of the at least one alternative service requirement includes the identifier of the first alternative service requirement, and the first QoS notification control indication information indicates to send indication information indicating that the QoS requirement of the first QoS flow cannot be guaranteed. The first session management network element receives the first policy from the second session management network element. The first session management network element determines a second policy according to the first policy, and sends the second policy to a first access network element, where the second policy includes the identifier of the first QoS flow, second QoS notification control indication information, and the at least one alternative QoS profile, and the second QoS notification control indication information is determined based on the first QoS notification control indication information. The first access network element receives the second policy. In the foregoing solution, the first access network element may communicate with the first session management network element, and receive the second policy from the first session management network element. The first access network element parses the second policy. The first access network element may obtain the identifier of the first QoS flow, the second QoS notification control indication information, and the at least one alternative QoS profile. The second QoS notification control indication information indicates to send the indication information indicating that the QoS requirement of the first QoS flow cannot be guaranteed. For example, the second QoS notification control indication information indicates the first access network element to send the first indication information to the user plane network element, so that the user plane network element can generate the first report information based on the first indication information, and send the first report information to the first session management network element, so that the first report information is quickly reported.

In a possible implementation, when the first session management network element is an intermediate session management network element, before the first session management network element receives the first report information from the user plane network element, the method further includes: A second session management network element sends a first policy to the first session management network element, where the first policy includes an identifier of the first QoS flow, first QoS notification control indication information, at least one alternative QoS profile, information about a notification endpoint of the application function network element, and an identifier that is of at least one alternative service requirement and that corresponds to an identifier of the at least one alternative QoS profile, the at least one alternative QoS profile includes the first alternative QoS profile, the identifier of the at least one alternative service requirement includes the identifier of the first alternative service requirement, and the first QoS notification control indication information indicates to send indication information indicating whether the QoS requirement of the first QoS flow can be guaranteed. The first session management network element receives the first policy from the second session management network element. The first session management network element determines a third policy according to the first policy, and sends the third policy to the user plane network element, where the third policy is used to indicate the user plane network element to send the indication information indicating whether the QoS requirement of the first QoS flow can be guaranteed. The user plane network element receives the third policy. In the foregoing solution, the user plane network element may communicate with the first session management network element, and receive the third policy from the first session management network element. The user plane network element parses the third policy. The user plane network element needs to send, according to the indication of the third policy, the indication information indicating whether the QoS requirement of the first QoS flow can be guaranteed. For example, when determining that the QoS requirement of the first QoS flow cannot be guaranteed, the user plane network element sends the foregoing first report information carrying the first indication information, so that the first report information is quickly reported.

In a possible implementation, that the first session management network element sends second report information to an application function network element based on the first report information includes: When the first indication information includes the identifier of the first QoS flow, the first session management network element determines the notification endpoint of the application function network element based on the identifier of the first QoS flow, and sends the second report information to the application function network element by using the notification endpoint of the application function network element. In the foregoing solution, after the first session management network element receives the first policy, the first session management network element parses the first policy to obtain the identifier of the first QoS flow and the information about the notification endpoint of the application function network element. The first session management network element determines, based on the identifier that is of the first QoS flow and that is carried in the first indication information, the notification endpoint that is of the application function network element and that is carried in the first policy, and sends the second report information to the notification endpoint, so that the application function network element can receive the second report information from the first session management network element. In at least one embodiment of this application, the first session management network element may send the second report information to the application function network element by using the notification endpoint of the application function network element, so that communication between the first session management network element and the application function network element is implemented. In this way, the application function network element can quickly receive the second report information, and perform adjustment at the application layer based on the second report information, so that a transmission delay of the second report information is reduced.

In a possible implementation, when the first session management network element is an intermediate session management network element, before the first session management network element receives the first report information from the user plane network element, the method further includes: A second session management network element sends a first policy to the first session management network element, where the first policy includes an identifier of the first QoS flow, first QoS notification control indication information, at least one alternative QoS profile, information about a notification endpoint of a local network exposure function network element, and an identifier that is of at least one alternative service requirement and that corresponds to an identifier of the at least one alternative QoS profile, the at least one alternative QoS profile includes the first alternative QoS profile, the identifier of the at least one alternative service requirement includes the identifier of the first alternative service requirement, and the first QoS notification control indication information indicates to send indication information indicating whether the QoS requirement of the first QoS flow can be guaranteed. The first session management network element receives the first policy from the second session management network element. The first session management network element determines a second policy according to the first policy, and sends the second policy to a first access network element, where the second policy includes the identifier of the first QoS flow, second QoS notification control indication information, and the at least one alternative QoS profile, and the second QoS notification control indication information is determined based on the first QoS notification control indication information. The first access network element receives the second policy. In the foregoing solution, the first access network element may communicate with the first session management network element, and receive the second policy from the first session management network element. The first access network element parses the second policy. The first access network element may obtain the identifier of the first QoS flow, the second QoS notification control indication information, and the at least one alternative QoS profile. The second QoS notification control indication information indicates to send the indication information indicating that the QoS requirement of the first QoS flow cannot be guaranteed. For example, the second QoS notification control indication information indicates the first access network element to send the first indication information to the user plane network element, so that the user plane network element can generate the first report information based on the first indication information, and send the first report information to the first session management network element, so that the first report information is quickly reported.

In a possible implementation, when the first session management network element is an intermediate session management network element, before the first session management network element receives the first report information from the user plane network element, the method further includes: A second session management network element sends a first policy to the first session management network element, where the first policy includes an identifier of the first QoS flow, first QoS notification control indication information, at least one alternative QoS profile, information about a notification endpoint of a local network exposure function network element, and an identifier that is of at least one alternative service requirement and that corresponds to an identifier of the at least one alternative QoS profile, the at least one alternative QoS profile includes the first alternative QoS profile, the identifier of the at least one alternative service requirement includes the identifier of the first alternative service requirement, and the first QoS notification control indication information indicates to send indication information indicating whether the QoS requirement of the first QoS flow can be guaranteed. The first session management network element receives the first policy from the second session management network element. The first session management network element determines a third policy according to the first policy, and sends the third policy to the user plane network element, where the third policy is used to indicate the user plane network element to send the indication information indicating whether the QoS requirement of the first QoS flow can be guaranteed. The user plane network element receives the third policy. In the foregoing solution, the user plane network element may communicate with the first session management network element, and receive the third policy from the first session management network element. The user plane network element parses the third policy. The user plane network element needs to send, according to the indication of the third policy, the indication information indicating whether the QoS requirement of the first QoS flow can be guaranteed. For example, when determining that the QoS requirement of the first QoS flow cannot be guaranteed, the user plane network element sends the foregoing first report information carrying the first indication information, so that the first report information is quickly reported.

In a possible implementation, that the first session management network element sends second report information to an application function network element includes: When the first indication information includes the identifier of the first QoS flow, the first session management network element determines the notification endpoint of the local network exposure function network element based on the identifier of the first QoS flow, and sends the second report information to the local network exposure function network element by using the notification endpoint of the local network exposure function network element, where the second report information is sent by the local network exposure function network element to the application function network element. In the foregoing solution, after the first session management network element receives the first policy, the first session management network element parses the first policy to obtain the identifier of the first QoS flow and the information about the notification endpoint of the local network exposure function network element. The first session management network element determines, based on the identifier that is of the first QoS flow and that is carried in the first indication information, the notification endpoint that is of the local network exposure function network element and that is carried in the first policy, and sends the second report information to the notification endpoint, so that the local network exposure function network element can receive the second report information from the first session management network element, and the local network exposure function network element sends the second report information to the application function network element. In at least one embodiment of this application, the first session management network element may send the second report information to the local network exposure function network element by using the notification endpoint of the local network exposure function network element, and then the local network exposure function network element sends the second report information to the application function network element, so that communication between the first session management network element and the application function network element is implemented. In this way, the application function network element can quickly receive the second report information, and perform adjustment at the application layer based on the second report information, so that a transmission delay of the second report information is reduced.

In a possible implementation, the method further includes: A policy control network element sends a fourth policy to the second session management network element, where the fourth policy includes at least one alternative QoS parameter set and the identifier that is of the at least one alternative service requirement and that corresponds to an identifier of the at least one alternative QoS parameter set. The second session management network element receives the fourth policy from the policy control network element. The second session management network element generates the first policy according to the fourth policy, where the at least one alternative QoS parameter set is used to determine the at least one alternative QoS profile, the identifier that is of the at least one alternative service requirement and that corresponds to the identifier of the at least one alternative QoS parameter set is used to determine the identifier that is of the at least one alternative service requirement and that corresponds to the identifier of the at least one alternative QoS profile, and the identifier of the at least one alternative service requirement includes the identifier of the first alternative service requirement. In the foregoing solution, the second session management network element receives the fourth policy from the policy control network element. The second session management network element parses the fourth policy, and determines the at least one alternative QoS parameter set and the identifier that is of the at least one alternative service requirement and that corresponds to the identifier of the at least one alternative QoS parameter set. The at least one alternative QoS parameter set is used to determine the at least one alternative QoS profile. The second session management network element generates the first policy. The first policy generated by the second session management network element includes the identifier of the first QoS flow, the first QoS notification control indication information, the at least one alternative QoS profile, the information about the notification endpoint of the application function network element, and the identifier that is of the at least one alternative service requirement and that corresponds to the identifier of the at least one alternative QoS profile. The second session management network element may generate the first policy by interacting with the policy control network element, so that the second session management network element can send the first policy to the first session management network element.

In a possible implementation, before the first session management network element receives the first report information from the user plane network element, the method further includes: A policy control network element sends a fourth policy to the first session management network element, where the fourth policy includes at least one alternative QoS parameter set and an identifier that is of at least one alternative service requirement and that corresponds to an identifier of the at least one alternative QoS parameter set, and the identifier of the at least one alternative service requirement includes the identifier of the first alternative service requirement. The first session management network element receives the fourth policy from the policy control network element. The first session management network element generates a first policy according to the fourth policy, where the at least one alternative QoS parameter set is used to determine at least one alternative QoS profile, the identifier that is of the at least one alternative service requirement and that corresponds to the identifier of the at least one alternative QoS parameter set is used to determine the identifier that is of the at least one alternative service requirement and that corresponds to an identifier of the at least one alternative QoS profile, the first policy includes an identifier of the first QoS flow, first QoS notification control indication information, the at least one alternative QoS profile, information about a notification endpoint of a target network element, and the identifier that is of the at least one alternative service requirement and that corresponds to the identifier of the at least one alternative QoS profile, the at least one alternative QoS profile includes the first alternative QoS profile, the identifier of the at least one alternative service requirement includes the identifier of the first alternative service requirement, the first QoS notification control indication information indicates to send indication information indicating whether the QoS requirement of the first QoS flow can be guaranteed, and the target network element includes a local network exposure function network element or the application function network element. In the foregoing solution, the first session management network element receives the fourth policy from the policy control network element. The first session management network element parses the fourth policy, and determines the at least one alternative QoS parameter set and the identifier that is of the at least one alternative service requirement and that corresponds to the identifier of the at least one alternative QoS parameter set. The at least one alternative QoS parameter set is used to determine the at least one alternative QoS profile. The first session management network element generates the first policy. The first policy generated by the first session management network element includes the identifier of the first QoS flow, the first QoS notification control indication information, the at least one alternative QoS profile, information about a notification endpoint of the application function network element, and the identifier that is of the at least one alternative service requirement and that corresponds to the identifier of the at least one alternative QoS profile. The first session management network element may generate the first policy by interacting with the policy control network element.

According to a third aspect, at least one embodiment of this application further provides a report information sending method, including: A policy control network element receives a service request from an application function network element, where the service request includes first quality of service QoS notification control indication information and at least one alternative service requirement, and the first QoS notification control indication information indicates to send indication information indicating whether a QoS requirement of a first service data flow can be guaranteed. The policy control network element generates a fourth policy based on the service request, where the fourth policy includes second QoS notification control indication information, at least one alternative QoS parameter set, and an identifier of that is of the at least one alternative service requirement and that corresponds to an identifier of the at least one alternative QoS parameter set, the at least one alternative quality of service QoS parameter set is determined based on the at least one alternative service requirement, and the second QoS notification control indication information indicates to send the indication information indicating whether the QoS requirement of the first service data flow can be guaranteed. The policy control network element sends the fourth policy to a first session management network element. In the foregoing solution, the application function network element provides an alternative service requirement when sending the service request to the policy control network element. The policy control network element determines an alternative QoS parameter set based on the alternative service requirement. The policy control network element may obtain the at least one alternative QoS parameter set, and obtain the identifier that is of the at least one alternative service requirement and that corresponds to the identifier of the at least one alternative QoS parameter set. Then the policy control network element generates the fourth policy, and sends the fourth policy to the first session management network element. The fourth policy includes the at least one alternative QoS parameter set and the identifier that is of the at least one alternative service requirement and that corresponds to the identifier of the at least one alternative QoS parameter set.

In a possible implementation, the service request further includes identification information of the first service data flow, and the fourth policy further includes the identification information of the first service data flow. In the foregoing solution, if the application function network element provides description information of a plurality of service data flows, the service request further includes the identification information of the first service data flow, and the fourth policy further includes the identification information of the first service data flow. For example, there is the first service data flow and a second service data flow, and the service request further includes the identification information of the first service data flow and identification information of the second service data flow. In at least one embodiment of this application, the service request sent by the application function network element to the policy control network element carries identification information of a service data flow. This resolves an indication problem of indicating, when there are the plurality of service data flows, whether a QoS requirement of each service flow can be guaranteed.

According to a fourth aspect, at least one embodiment of this application provides a communication apparatus. The communication apparatus is specifically a first session management network element. The first session management network element is configured to perform the method according to any one of the possible implementations of the first aspect.

According to a fifth aspect, at least one embodiment of this application provides a communication apparatus. The communication apparatus is specifically a policy control network element. The policy control network element is configured to perform the method according to any one of the possible implementations of the third aspect.

According to a sixth aspect, at least one embodiment of this application provides a communication system, including a user plane network element, a first session management network element, and an application function network element. The user plane network element is configured to perform any method performed by the user plane network element in the second aspect. The first session management network element is configured to perform any method performed by the first session management network element in the second aspect. The application function network element is configured to perform any method performed by the application function network element in the second aspect.

In a possible implementation, the communication system further includes at least one of the following: a second session management network element, a policy control network element, a first access network element, a second access network element, and a local network exposure function network element.

According to a seventh aspect, at least one embodiment of this application provides a computer-readable storage medium. The computer-readable storage medium stores instructions. When the instructions are run on a computer, the computer is enabled to perform the method according to any one of the first aspect, the second aspect, or the third aspect.

According to an eighth aspect, at least one embodiment of this application provides a computer program product including instructions. When the instructions are run on a computer, the computer is enabled to perform the method according to any one of the first aspect, the second aspect, or the third aspect.

According to a ninth aspect, at least one embodiment of this application provides a communication apparatus. The communication apparatus may include an entity such as a user plane network element, a first session management network element, a second session management network element, an intermediate session management network element, a first access network element, a second access network element, a local network exposure function network element, an application function network element, a policy control network element, or a chip. The communication apparatus includes a processor, and optionally, further includes a memory. The memory is configured to store instructions. The processor is configured to execute the instructions in the memory, so that the communication apparatus performs the method according to any one of the first aspect, the second aspect, or the third aspect.

According to a tenth aspect, this application provides a chip system. The chip system includes a processor, configured to support a user plane network element, a first session management network element, an application function network element, or a policy control network element in implementing a function in the foregoing aspects, for example, sending or processing the data and/or the information in the foregoing methods. In a possible design, the chip system further includes a memory. The memory is configured to store program instructions and data that are necessary for the user plane network element, the first session management network element, the application function network element, or the policy control network element. The chip system may include a chip, or may include the chip and another discrete component.

DESCRIPTION OF EMBODIMENTS

Figure 1:
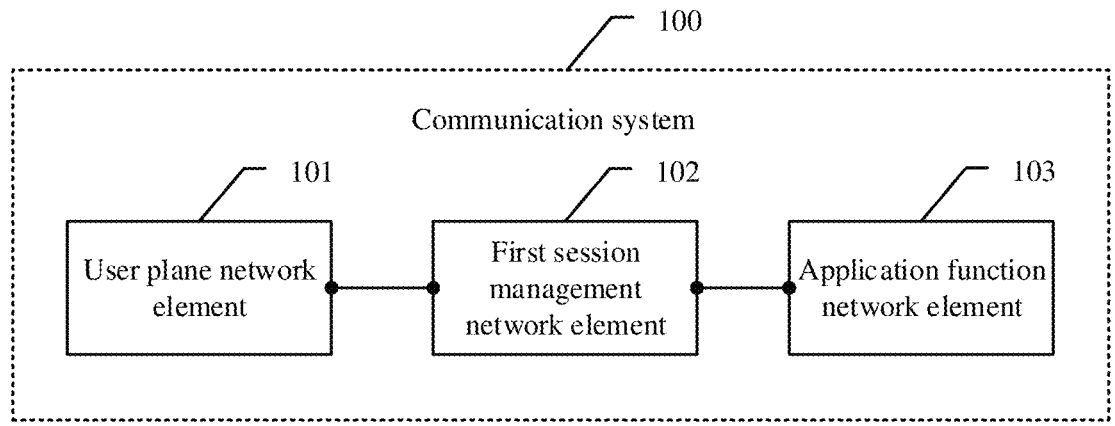
FIG. 1 is a schematic diagram of a composition structure of a communication system according to at least one embodiment of this application.

Embodiments of this application provide a report information sending method, a communication apparatus, and a communication system, to shorten a transmission path for reporting information, and reduce a processing delay of an application function network element.

The following describes embodiments of this application with reference to the accompanying drawings.

In the specification, claims, and the accompanying drawings of this application, the terms "first", "second", and the like are intended to distinguish similar objects but do not necessarily indicate a specific order or sequence. It should be understood that the terms used in such a way are interchangeable in proper circumstances, and this is merely a discrimination manner for describing objects having a same attribute in embodiments of this application. In addition, the terms "include", "have" and any variant thereof mean to cover the non-exclusive inclusion, so that a process, method, system, product, or device that includes a series of units is not necessarily limited to those units, but may include other units not expressly listed or inherent to such a process, method, product, or device.

The technical solutions in embodiments of this application may be applied to various communication systems for data processing, for example, a code division multiple access (code division multiple access, CDMA) system, a time division multiple access (time division multiple access, TDMA) system, a frequency division multiple access (frequency division multiple access, FDMA) system, an orthogonal frequency division multiple access (orthogonal frequency-division multiple access, OFDMA) system, a single-carrier frequency division multiple access (single carrier FDMA, SC-FDMA) system, and another system. Terms "system" and "network" are interchangeable. The CDMA system may implement wireless technologies such as universal terrestrial radio access (universal terrestrial radio access, UTRA) and CDMA2000. The UTRA may include a wideband CDMA (wideband CDMA, WCDMA) technology and another variant technology of CDMA. The CDMA2000 may cover the interim standard (interim standard, IS) 2000 (IS-2000), the IS-95, and the IS-856 standard. A wireless technology such as a global system for mobile communications (global system for mobile communication, GSM) may be implemented in the TDMA system. Wireless technologies such as evolved universal terrestrial radio access (evolved UTRA, E-UTRA), ultra mobile broadband (ultra mobile broadband, UMB), IEEE 802.11 (Wi-Fi), IEEE 802.16 (WiMAX), IEEE 802.20, and Flash OFDMA may be implemented in the OFDMA system. The UTRA and the E-UTRA correspond to UMTS and an evolved version of the UMTS. Long term evolution (long term evolution, LTE) and various versions evolved based on LTE in 3GPP are a new version of the UMTS that uses the E-UTRA. A 5th generation (5 Generation, "5G" for short) communication system or new radio (New Radio, "NR" for short) is a next generation communication system under study. In addition, the communication system is further applicable to a future-oriented communication technology, and is applicable to the technical solutions provided in embodiments of this application. A system architecture and a service scenario described in embodiments of this application are intended to describe the technical solutions in embodiments of this application more clearly, and do not constitute a limitation on the technical solutions provided in embodiments of this application. A person of ordinary skill in the art may know that, with evolution of a network architecture and emergence of a new service scenario, the technical solutions provided in embodiments of this application are also applicable to similar technical problems.

FIG. 1 is a schematic diagram of a composition structure of a communication system according to at least one embodiment of this application. At least one embodiment of this application provides a communication system 100, including:

a user plane network element 101, configured to send first report information to a first session management network element 102, where the first report information includes first indication information and an identifier of a first alternative quality of service (quality of service, QoS) profile, and the first indication information indicates that a QoS requirement of a first quality of service flow (quality of service flow, QoS Flow) cannot be guaranteed;

the first session management network element 102, configured to receive the first report information from the user plane network element 101, where the first session management network element 102 is configured to send second report information to an application function network element 103, where the second report information includes second indication information and an identifier of a first alternative service requirement, the identifier of the first alternative service requirement corresponds to an identifier of a first alternative QoS profile, the second indication information indicates that a QoS requirement of a first service data flow cannot be guaranteed, the first QoS flow is used to transmit the first service data flow, and the service data flow is a service data flow of an application corresponding to the application function network element 103; and the application function network element 103, configured to receive the second report information sent by the first session management network element 102.

The user plane network element 101 can separately communicate with a radio access network (radio access network, RAN) and the first session management network element 102. The user plane network element 101 may be specifically a user plane function (user plane function, UPF) network element. Specifically, the user plane network element 101 may be located in a local data center (local data center), and the user plane network element 101 may also be referred to as a local protocol data unit anchor (local PDU session anchor, local PSA). For example, the user plane network element 101 may support all or some of the following functions: interconnecting a protocol data unit (protocol data unit, PDU) session with a data network, packet routing and transfer (for example, supporting transfer of traffic to the data network after uplink classification), data packet detection, and the like.

The user plane network element 101 may communicate with the first session management network element 102. For example, an N4 interface is established between the user plane network element 101 and the first session management network element 102.

The first session management network element 102 is a PDU session management network element. For example, the first session management network element 102 is located in the local data center, and the first session management network element 102 may be specifically a session management function (session management function, SMF). For another example, the first session management network element 102 may be specifically an intermediate session management function (intermediate session management function, I-SMF), and the first session management network element 102 may communicate with an SMF in a central data center (central DC). For example, the N4 interface is established between the first session management network element 102 and the user plane network element 101. For example, an N33 interface is established between the first session management network element 102 and the application function network element 103. Alternatively, an Nx interface is established between the first session management network element 102 and a local network exposure function (local network exposure function, local NEF) network element, an N33 interface is established between the local network exposure function network element and the application function network element 103, and the first session management network element 102 communicates with the application function network element 103 by using the local network exposure function network element. An implementation of the first session management network element 102 may be specifically determined based on an application scenario. This is not limited herein.

The application function network element 103 may communicate with the first session management network element 102, to obtain report information of QoS, and adjust a function at an application layer based on the report information. For example, the application function network element 103 may be specifically an application function (application function, AF) network element in the local data center. For example, the AF is deployed on an edge application server (edge application server, EAS).

Figure 2:
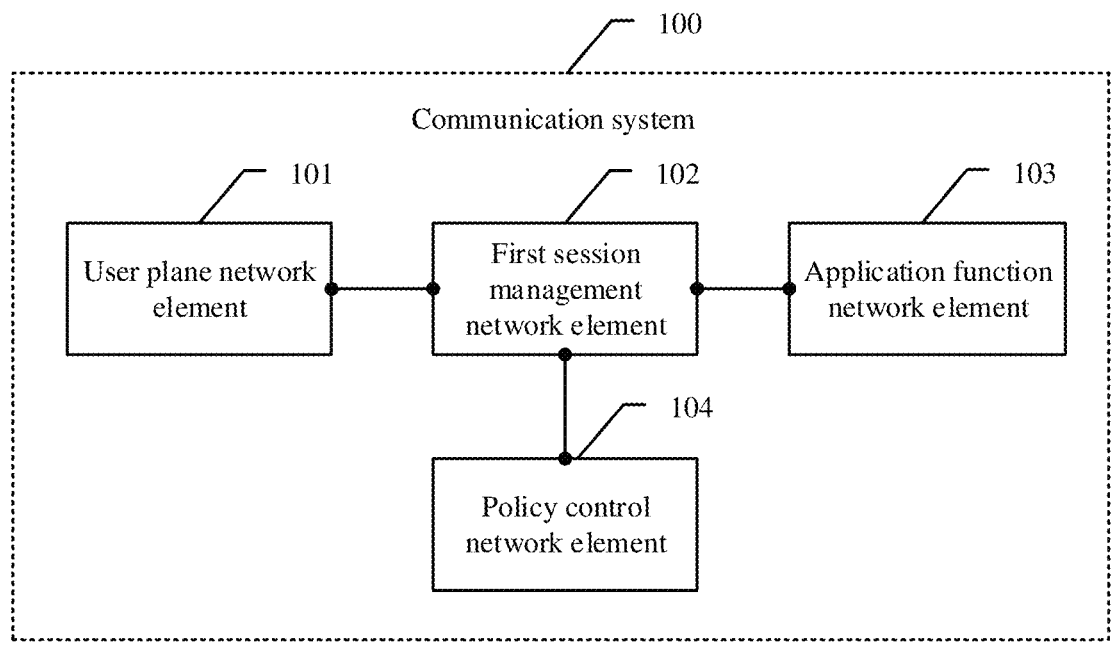
FIG. 2 is a schematic diagram of a composition structure of another communication system according to at least one embodiment of this application.

Refer to FIG. 2. In some embodiments of this application, in addition to including a user plane network element 101, a first session management network element 102, and an application function network element 103, a communication system 100 provided in at least one embodiment of this application may further include:

a policy control network element 104, configured to receive a service request from the application function network element 103, where the service request includes first quality of service QoS notification control indication information and at least one alternative service requirement, and the first QoS notification control indication information indicates to send indication information indicating whether a QoS requirement of a first service data flow can be guaranteed.

The policy control network element 104 is configured to generate a fourth policy based on the service request, where the fourth policy includes second QoS notification control indication information, at least one alternative QoS parameter set, and an identifier of that is of the at least one alternative service requirement and that corresponds to an identifier of the at least one alternative QoS parameter set, the at least one alternative quality of service QoS parameter set is determined based on the at least one alternative service requirement, and the second QoS notification control indication information indicates to send the indication information indicating whether the QoS requirement of the first service data flow can be guaranteed.

The policy control network element 104 is configured to send the fourth policy to the first session management network element 102.

The policy control network element 104 is a function network element providing a policy. For example, the policy control network element 104 may be specifically a policy control function (policy control function, PCF) network element in a central data center. The policy control network element 104 may formulate a policy and charging control (policy and charging control, PCC) rule, and the fourth policy is carried in the PCC rule.

The policy control network element 104 may communicate with the application function network element 103. For example, the policy control network element 104 communicates with the application function network element 103 by using a network exposure function (network exposure function, NEF) network element. For example, an N5 interface is configured between the policy control network element 104 and the network exposure function network element, and an N33 interface is configured between the network exposure function network element and the application function network element 103. For another example, the policy control network element 104 communicates with the application function network element 103 by using the network exposure function network element and a local network exposure function network element. An N5 interface is configured between the policy control network element 104 and the network exposure function network element, an N33a interface is configured between the network exposure function network element and the local network exposure function network element, and an N33 interface is configured between the local network exposure function network element and the application function network element 103.

It should be noted that the communication system 100 in at least one embodiment of this application may further include the local network exposure function network element and the network exposure function network element, which are not illustrated in FIG. 2. Similarly, the communication system 100 may further include network elements, for example, a second session management network element, a first access network element, and a second access network element, mentioned in subsequent embodiments. The network elements are all not illustrated in the figure. The first access network element may be a radio access network in which a terminal device is located before handover, and the second access network element may be a radio access network in which the terminal device is located after the handover.

It can be learned from the descriptions of the composition structures of the communication systems in the foregoing embodiments that, in the communication systems, because the first session management network element may receive the first report information from the user plane network element, and the first report information carries the first indication information and the identifier of the first QoS profile, the first session management network element may obtain the second indication information based on the first indication information, and may further determine the identifier of the first alternative service requirement based on the identifier of the first alternative QoS profile. Therefore, the first session management network element may generate the second report information. The first session management network element sends the second report information to the application function management network element, and the second indication information in the second report information indicates that the QoS requirement of the first service data flow cannot be guaranteed. In embodiments of this application, based on a path "the user plane network element—the first session management network element—the application function network element", the application function network element can determine that the QoS requirement of the first service data flow cannot be guaranteed. In addition, the second report information further carries the identifier of the first alternative service requirement, so that the application function network element can further determine an alternative service requirement. In this way, the application function network element quickly performs adjustment at the application layer based on the first alternative service requirement when determining that the QoS requirement of the first service data flow cannot be guaranteed. Therefore, a path for indicating that the QoS requirement of the first service data flow cannot be guaranteed is greatly shortened. For a service with high time sensitivity, timeliness of the second report information is high, and a delay that occurs when the application function network element performs adjustment at the application layer is reduced.

Figure 3:
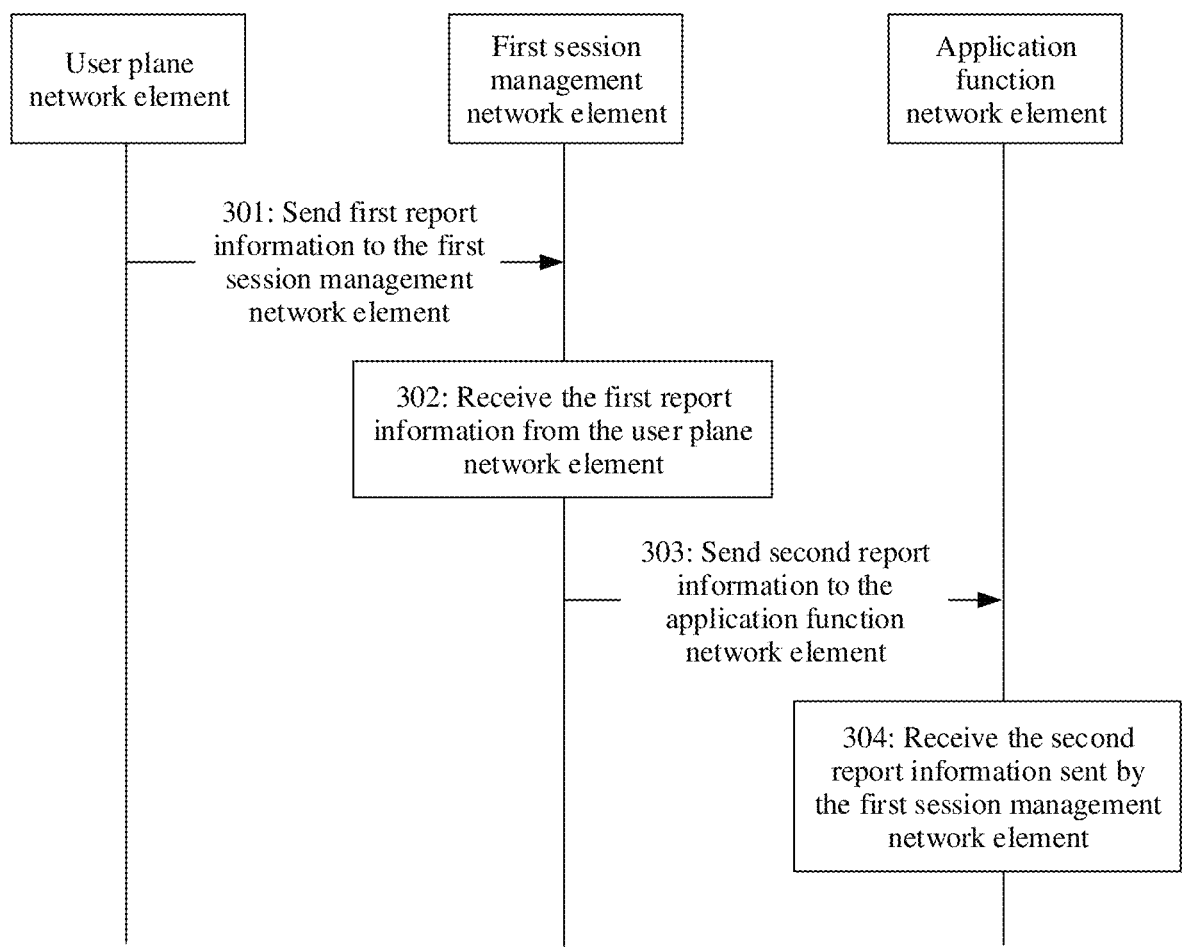
FIG. 3 is a schematic diagram of an interaction procedure of a report information sending method according to at least one embodiment of this application.

The communication systems provided in this application are described in the foregoing embodiments. The following describes a communication method performed based on the communication systems. In FIG. 3, a report information sending method provided in at least one embodiment of this application mainly includes the following steps.

301: The user plane network element sends first report information to the first session management network element, where the first report information includes first indication information and an identifier of a first alternative quality of service QoS profile, and the first indication information indicates that a QoS requirement of a first quality of service flow QoS flow cannot be guaranteed.

The user plane network element may learn, from a RAN, whether the QoS requirement of the first QoS flow can be guaranteed. The first QoS flow is a QoS flow that carries a first service data flow. For example, the user plane network element generates the first indication information when determining that the QoS requirement of the first QoS flow cannot be guaranteed, and may further determine the identifier of the first alternative (Alternative) QoS profile (Profile) when determining that the QoS requirement of the first QoS flow cannot be guaranteed. The first alternative QoS profile may be a QoS profile that can guarantee the QoS requirement of the first QoS flow. For example, the identifier of the first alternative QoS profile may be a first AltProId.

Optionally, the first report information may be specifically a data packet that carries a QoS notification control (Notification Control) event report.

For example, the QoS requirement of the first QoS flow may include one or more of a maximum bandwidth (namely, a maximum transmission bit rate (max bit rate)), a guaranteed bandwidth (namely, a guaranteed bit rate (guaranteed bit rate)), a packet delay budget (packet delay budget), and a packet error rate (packet error rate). Particularly, the first indication information indicates that the guaranteed bandwidth of the first quality of service flow QoS flow cannot be guaranteed.

302: The first session management network element receives the first report information from the user plane network element.

It can be learned from the communication system shown in FIG. 1 that the user plane network element may communicate with the first session management network element. For example, an N4 interface is established between the user plane network element and the first session management network element. The first session management network element may receive the first report information from the user plane network element. The first report information includes the first indication information and the identifier of the first alternative quality of service QoS profile, and the first indication information indicates that the QoS requirement of the first quality of service flow QoS flow cannot be guaranteed.

In some embodiments of this application, the first session management network element may be an intermediate session management network element. For example, the first session management network element may be an I-SMF. The first session management network element is located in a local data center. The second session management network element may be deployed in a central data center. For example, the second session management network element may be an SMF. An N16a interface may be configured between the first session management network element and the second session management network element. When the first session management network element is the intermediate session management network element, before step 302 in which the first session management network element receives the first report information from the user plane network element, the report information sending method provided in at least one embodiment of this application further includes the following steps.

S01: The second session management network element sends a first policy to the first session management network element, where the first policy includes an identifier of the first QoS flow, first QoS notification control indication information, at least one alternative QoS profile, information about a notification endpoint of the application function network element, and an identifier that is of at least one alternative service requirement and that corresponds to an identifier of the at least one alternative QoS profile, the at least one alternative QoS profile includes the first alternative QoS profile, the identifier of the at least one alternative service requirement includes an identifier of a first alternative service requirement, and the first QoS notification control indication information indicates to send indication information indicating that the QoS requirement of the first QoS flow cannot be guaranteed.

The second session management network element may generate the first policy. The second session management network element may communicate with the first session management network element. The second session management network element sends the first policy to the first session management network element.

Specifically, the first policy generated by the second session management network element includes the identifier of the first QoS flow, the first QoS notification control indication information, the at least one alternative QoS profile, the information about the notification endpoint of the application function network element, and the identifier that is of the at least one alternative service requirement and that corresponds to the identifier of the at least one alternative QoS profile. The at least one alternative QoS profile includes the first alternative QoS profile. The identifier of the at least one alternative service requirement includes the identifier of the first alternative service requirement. The identifier that is of the at least one alternative service requirement and that corresponds to the identifier of the at least one alternative QoS profile indicates a correspondence between an alternative QoS profile and an alternative service requirement. The information about the notification endpoint of the application function network element includes the notification endpoint corresponding to the application function network element. For example, the notification endpoint corresponding to the application function network element may be a notification endpoint 1a (Notification Endpoint 1a). The notification endpoint 1a includes a notification target address 1a (Notification Target Address 1a) for receiving a notification of a QoS notification control event. Alternatively, the notification endpoint 1a includes a notification target address 1a (Notification Target Address 1a) and a notification correlation identifier 1a (Notification Correlation Id 1a).

The first policy sent by the second session management network element may further include the first QoS notification control indication information, indicating to send the indication information indicating that the QoS requirement of the first QoS flow cannot be guaranteed. That is, the first QoS notification control indication information may indicate that the foregoing first indication information needs to be sent.

S02: The first session management network element receives the first policy from the second session management network element.

The first session management network element may communicate with the second session management network element. The second session management network element sends the first policy to the first session management network element. The first session management network element receives the first policy from the second session management network element. The first session management network element parses the first policy to obtain the identifier of the first QoS flow, the first QoS notification control indication information, the at least one alternative QoS profile, the information about the notification endpoint of the application function network element, and the identifier that is of the at least one alternative service requirement and that corresponds to the identifier of the at least one alternative QoS profile.

S03: The first session management network element determines a second policy according to the first policy, and sends the second policy to the first access network element, where the second policy includes the identifier of the first QoS flow, second QoS notification control indication information, and the at least one alternative QoS profile, and the second QoS notification control indication information is determined based on the first QoS notification control indication information.

The first session management network element may obtain the identifier of the first QoS flow, the first QoS notification control indication information, the at least one alternative QoS profile, the information about the notification endpoint of the application function network element, and the identifier that is of the at least one alternative service requirement and that corresponds to the identifier of the at least one alternative QoS profile. Then the first session management network element generates the second policy. The second policy includes the identifier of the first QoS flow, the second QoS notification control indication information, and the at least one alternative QoS profile. The second QoS notification control indication information is determined based on the first QoS notification control indication information. For example, the second QoS notification control indication information and the first QoS notification control indication information may be same QoS notification control indication information. That is, the second QoS notification control indication information indicates to send the indication information indicating that the QoS requirement of the first QoS flow cannot be guaranteed. That is, the first QoS notification control indication information may indicate that the foregoing first indication information needs to be sent. For another example, the second QoS notification control indication information is generated based on indication information content carried in the first QoS notification control indication information. Specifically, the second QoS notification control indication information may be obtained by adding a specific information field to the first QoS notification control indication information according to a communication protocol requirement of information transmission. Alternatively, the second QoS notification control indication information may be obtained by extracting an unnecessary information field from the first QoS notification control indication information according to a communication protocol requirement of information transmission.

The first session management network element may communicate with the first access network element. For example, the first session management network element sends the second policy to the first access network element. The first access network element may be a radio access network in which a terminal device is located before handover. Specifically, an N11 interface may be established between the first session management network element and an access and mobility management function (access and mobility management function, AMF), and an N2 interface is established between the AMF and the first access network element.

S04: The first access network element receives the second policy.

The first access network element may communicate with the first session management network element, and receive the second policy from the first session management network element. The first access network element parses the second policy. The first access network element may obtain the identifier of the first QoS flow, the second QoS notification control indication information, and the at least one alternative QoS profile. The second QoS notification control indication information indicates to send the indication information indicating that the QoS requirement of the first QoS flow cannot be guaranteed. For example, the second QoS notification control indication information indicates the first access network element to send the first indication information to the user plane network element.

In some embodiments of this application, the first session management network element may be an intermediate session management network element. For example, the first session management network element may be an I-SMF. The first session management network element is located in a local data center. The second session management network element may be deployed in a central data center. For example, the second session management network element may be an SMF. An N16a interface may be configured between the first session management network element and the second session management network element. When the first session management network element is the intermediate session management network element, before step 302 in which the first session management network element receives the first report information from the user plane network element, the report information sending method provided in at least one embodiment of this application further includes the following steps.

S11: The second session management network element sends a first policy to the first session management network element, where the first policy includes an identifier of the first QoS flow, first QoS notification control indication information, at least one alternative QoS profile, information about a notification endpoint of the application function network element, and an identifier that is of at least one alternative service requirement and that corresponds to an identifier of the at least one alternative QoS profile, the at least one alternative QoS profile includes the first alternative QoS profile, the identifier of the at least one alternative service requirement includes an identifier of a first alternative service requirement, and the first QoS notification control indication information indicates to send indication information indicating whether the QoS requirement of the first QoS flow can be guaranteed.

The second session management network element may generate the first policy. The second session management network element may communicate with the first session management network element. The second session management network element sends the first policy to the first session management network element.

Specifically, the first policy generated by the second session management network element includes the identifier of the first QoS flow, the first QoS notification control indication information, the at least one alternative QoS profile, the information about the notification endpoint of the application function network element, and the identifier that is of the at least one alternative service requirement and that corresponds to the identifier of the at least one alternative QoS profile. The at least one alternative QoS profile includes the first alternative QoS profile. The identifier of the at least one alternative service requirement includes the identifier of the first alternative service requirement. The identifier that is of the at least one alternative service requirement and that corresponds to the identifier of the at least one alternative QoS profile indicates a correspondence between an alternative QoS profile and an alternative service requirement. The information about the notification endpoint of the application function network element includes the notification endpoint corresponding to the application function network element. For example, the notification endpoint corresponding to the application function network element may be a notification endpoint 1a (Notification Endpoint 1a). The notification endpoint 1a includes a notification target address 1a (Notification Target Address 1a) for receiving a notification of a QoS notification control event. Alternatively, the notification endpoint 1a includes a notification target address 1a (Notification Target Address 1a) and a notification correlation identifier 1a (Notification Correlation Id 1a).

The first policy sent by the second session management network element may further include the first QoS notification control indication information, indicating to send indication information indicating that the QoS requirement of the first QoS flow cannot be guaranteed. That is, the first QoS notification control indication information may indicate that the foregoing first indication information needs to be sent.

S12: The first session management network element receives the first policy from the second session management network element.

The first session management network element may communicate with the second session management network element. The second session management network element sends the first policy to the first session management network element. The first session management network element receives the first policy from the second session management network element. The first session management network element parses the first policy to obtain the identifier of the first QoS flow, the first QoS notification control indication information, the at least one alternative QoS profile, the information about the notification endpoint of the application function network element, and the identifier that is of the at least one alternative service requirement and that corresponds to the identifier of the at least one alternative QoS profile.

S13: The first session management network element determines a third policy according to the first policy, and sends the third policy to the user plane network element, where the third policy is used to indicate the user plane network element to send the indication information indicating whether the QoS requirement of the first QoS flow can be guaranteed.

The first session management network element may obtain the identifier of the first QoS flow, the first QoS notification control indication information, the at least one alternative QoS profile, the information about the notification endpoint of the application function network element, and the identifier that is of the at least one alternative service requirement and that corresponds to the identifier of the at least one alternative QoS profile. Then the first session management network element generates the third policy. The third policy is used to indicate the user plane network element to send the indication information indicating whether the QoS requirement of the first QoS flow can be guaranteed. It can be learned from the foregoing descriptions that the first session management network element may communicate with the user plane network element, and the first session management network element sends the third policy to the user plane network element.

S14: The user plane network element receives the third policy.

The user plane network element may communicate with the first session management network element, and receive the third policy from the first session management network element. The user plane network element parses the third policy. The user plane network element needs to send, according to the indication of the third policy, the indication information indicating whether the QoS requirement of the first QoS flow can be guaranteed. For example, when determining that the QoS requirement of the first QoS flow cannot be guaranteed, the user plane network element sends the foregoing first report information carrying the first indication information.

In some embodiments of this application, the first session management network element may be an intermediate session management network element. For example, the first session management network element may be an I-SMF. The first session management network element is located in a local data center. The second session management network element may be deployed in a central data center. For example, the second session management network element may be an SMF. An N16a interface may be configured between the first session management network element and the second session management network element. When the first session management network element is the intermediate session management network element, before step 302 in which the first session management network element receives the first report information from the user plane network element, the report information sending method provided in at least one embodiment of this application further includes the following steps.

S21: The second session management network element sends a first policy to the first session management network element, where the first policy includes an identifier of the first QoS flow, first QoS notification control indication information, at least one alternative QoS profile, information about a notification endpoint of the local network exposure function network element, and an identifier that is of at least one alternative service requirement and that corresponds to an identifier of the at least one alternative QoS profile, the at least one alternative QoS profile includes the first alternative QoS profile, the identifier of the at least one alternative service requirement includes an identifier of a first alternative service requirement, and the first QoS notification control indication information indicates to send indication information indicating whether the QoS requirement of the first QoS flow can be guaranteed.

The information that is about the notification endpoint and that is carried in the first policy in step S21 is different from the information that is about the notification endpoint and that is carried in the first policy in step S01. In step S21, the first policy includes the information about the notification endpoint of the local network exposure function network element. The information about the notification endpoint of the local network exposure function network element includes the notification endpoint corresponding to the local network exposure function network element. For example, the notification endpoint corresponding to the local network exposure function network element may be a notification endpoint 1a (Notification Endpoint 1a). The notification endpoint 1a includes a notification target address 1a (Notification Target Address 1a) for receiving a notification of a QoS notification control event. Alternatively, the notification endpoint 1a includes a notification target address 1a (Notification Target Address 1a) and a notification correlation identifier 1a (Notification Correlation Id 1a).

S22: The first session management network element receives the first policy from the second session management network element.

S23: The first session management network element determines a second policy according to the first policy, and sends the second policy to the first access network element, where the second policy includes the identifier of the first QoS flow, second QoS notification control indication information, and the at least one alternative QoS profile, and the second QoS notification control indication information is determined based on the first QoS notification control indication information.

S24: The first access network element receives the second policy.

An implementation of step S22 to step S24 is similar to that of step S02 to step S04 in the foregoing embodiments. Details are not described herein again.

In some embodiments of this application, the first session management network element may be an intermediate session management network element. For example, the first session management network element may be an I-SMF. The first session management network element is located in a local data center. The second session management network element may be deployed in a central data center. For example, the second session management network element may be an SMF. An N16a interface may be configured between the first session management network element and the second session management network element. When the first session management network element is the intermediate session management network element, before step 302 in which the first session management network element receives the first report information from the user plane network element, the report information sending method provided in at least one embodiment of this application further includes the following steps.

S31: The second session management network element sends a first policy to the first session management network element, where the first policy includes an identifier of the first QoS flow, first QoS notification control indication information, at least one alternative QoS profile, information about a notification endpoint of the local network exposure function network element, and an identifier that is of at least one alternative service requirement and that corresponds to an identifier of the at least one alternative QoS profile, the at least one alternative QoS profile includes the first alternative QoS profile, the identifier of the at least one alternative service requirement includes an identifier of a first alternative service requirement, and the first QoS notification control indication information indicates to send indication information indicating whether the QoS requirement of the first QoS flow can be guaranteed.

The information that is about the notification endpoint and that is carried in the first policy in step S31 is different from the information that is about the notification endpoint and that is carried in the first policy in step S11. In step S31, the first policy includes the information about the notification endpoint of the local network exposure function network element. The information about the notification endpoint of the local network exposure function network element includes the notification endpoint corresponding to the local network exposure function network element. For example, the notification endpoint corresponding to the local network exposure function network element may be a notification endpoint 1a (Notification Endpoint 1a). The notification endpoint 1a includes a notification target address 1a (Notification Target Address 1a) for receiving a notification of a QoS notification control event. Alternatively, the notification endpoint 1a includes a notification target address 1a (Notification Target Address 1a) and a notification correlation identifier 1a (Notification Correlation Id 1a).

S32: The first session management network element receives the first policy from the second session management network element.

S33: The first session management network element determines a third policy according to the first policy, and sends the third policy to the user plane network element, where the third policy is used to indicate the user plane network element to send the indication information indicating whether the QoS requirement of the first QoS flow can be guaranteed.

S34: The user plane network element receives the third policy.

An implementation of step S32 to step S34 is similar to that of step S12 to step S14 in the foregoing embodiments. Details are not described herein again.

In some embodiments of this application, before step S01, step S11, step S21, or step S31 in which the second session management network element sends the first policy to the first session management network element, the report information sending method provided in at least one embodiment of this application may further include the following steps.

S41: The policy control network element sends a fourth policy to the second session management network element, where the fourth policy includes at least one alternative QoS parameter set and the identifier that is of the at least one alternative service requirement and that corresponds to an identifier of the at least one alternative QoS parameter set.

S42: The second session management network element receives the fourth policy from the policy control network element.

S43: The second session management network element generates the first policy according to the fourth policy, where the at least one alternative QoS parameter set is used to determine the at least one alternative QoS profile, the identifier that is of the at least one alternative service requirement and that corresponds to the identifier of the at least one alternative QoS parameter set is used to determine the identifier that is of the at least one alternative service requirement and that corresponds to the identifier of the at least one alternative QoS profile, and the identifier of the at least one alternative service requirement includes the identifier of the first alternative service requirement.

Both the second session management network element and the policy control network element are located in the central data center. The second session management network element and the policy control network element may communicate with each other through an N7 interface. The application function network element provides an alternative service requirement when sending a service request to the policy control network element. The policy control network element determines an alternative QoS parameter set based on the alternative service requirement. The policy control network element may obtain the at least one alternative QoS parameter set, and obtain the identifier that is of the at least one alternative service requirement and that corresponds to the identifier of the at least one alternative QoS parameter set. Then the policy control network element generates the fourth policy, and sends the fourth policy to the second session management network element. The fourth policy includes the at least one alternative QoS parameter set and the identifier that is of the at least one alternative service requirement and that corresponds to the identifier of the at least one alternative QoS parameter set.

The second session management network element receives the fourth policy from the policy control network element. The second session management network element parses the fourth policy, and determines the at least one alternative QoS parameter set and the identifier that is of the at least one alternative service requirement and that corresponds to the identifier of the at least one alternative QoS parameter set. The at least one alternative QoS parameter set is used to determine the at least one alternative QoS profile. The second session management network element generates the first policy. The first policy generated by the second session management network element includes the identifier of the first QoS flow, the first QoS notification control indication information, the at least one alternative QoS profile, the information about the notification endpoint of the application function network element, and the identifier that is of the at least one alternative service requirement and that corresponds to the identifier of the at least one alternative QoS profile. The second session management network element may generate the first policy by interacting with the policy control network element, so that the second session management network element can send the first policy to the first session management network element.

In some embodiments of this application, the first session management network element may be a session management network element. For example, the first session management network element may be an SMF. The first session management network element is located in a local data center. The policy control network element may be deployed in a central data center. For example, the policy control network element may be a PCF. An N7 interface may be configured between the first session management network element and the policy control network element. When the first session management network element is the session management network element in the local data center, before step 302 in which the first session management network element receives the first report information from the user plane network element, the report information sending method provided in at least one embodiment of this application further includes the following steps.

The policy control network element sends a fourth policy to the first session management network element, where the fourth policy includes at least one alternative QoS parameter set and an identifier that is of at least one alternative service requirement and that corresponds to an identifier of the at least one alternative QoS parameter set, and the identifier of the at least one alternative service requirement includes an identifier of a first alternative service requirement.

The first session management network element receives the fourth policy from the policy control network element.

The first session management network element generates a first policy according to the fourth policy, where the at least one alternative QoS parameter set is used to determine at least one alternative QoS profile, the identifier that is of the at least one alternative service requirement and that corresponds to the identifier of the at least one alternative QoS parameter set is used to determine the identifier that is of the at least one alternative service requirement and that corresponds to an identifier of the at least one alternative QoS profile, the first policy includes an identifier of the first QoS flow, first QoS notification control indication information, the at least one alternative QoS profile, information about a notification endpoint of a target network element, and the identifier that is of the at least one alternative service requirement and that corresponds to the identifier of the at least one alternative QoS profile, the at least one alternative QoS profile includes the first alternative QoS profile, the identifier of the at least one alternative service requirement includes the identifier of the first alternative service requirement, the first QoS notification control indication information indicates to send indication information indicating whether the QoS requirement of the first QoS flow can be guaranteed, and the target network element includes the local network exposure function network element or the application function network element.

The first session management network element is located in the local data center. The policy control network element is located in the central data center. The first session management network element and the policy control network element may communicate with each other through the N7 interface. The application function network element provides an alternative service requirement when sending a service request to the policy control network element. The policy control network element determines an alternative QoS parameter set based on the alternative service requirement. The policy control network element may obtain the at least one alternative QoS parameter set, and obtain the identifier that is of the at least one alternative service requirement and that corresponds to the identifier of the at least one alternative QoS parameter set. Then the policy control network element generates the fourth policy, and sends the fourth policy to the first session management network element. The fourth policy includes the at least one alternative QoS parameter set and the identifier that is of the at least one alternative service requirement and that corresponds to the identifier of the at least one alternative QoS parameter set.

The first session management network element receives the fourth policy from the policy control network element. The first session management network element parses the fourth policy, and determines the at least one alternative QoS parameter set and the identifier that is of the at least one alternative service requirement and that corresponds to the identifier of the at least one alternative QoS parameter set. The at least one alternative QoS parameter set is used to determine the at least one alternative QoS profile. The first session management network element generates the first policy. The first policy generated by the first session management network element includes the identifier of the first QoS flow, the first QoS notification control indication information, the at least one alternative QoS profile, the information about the notification endpoint of the application function network element, and the identifier that is of the at least one alternative service requirement and that corresponds to the identifier of the at least one alternative QoS profile. The first session management network element may generate the first policy by interacting with the policy control network element.

In some embodiments of this application, the report information sending method provided in at least one embodiment of this application includes the following steps.

The policy control network element receives a service request from the application function network element, where the service request includes first quality of service QoS notification control indication information and at least one alternative service requirement, and the first QoS notification control indication information indicates to send indication information indicating whether a QoS requirement of a first service data flow can be guaranteed.

The policy control network element generates a fourth policy based on the service request, where the fourth policy includes second QoS notification control indication information, at least one alternative QoS parameter set, and an identifier of that is of the at least one alternative service requirement and that corresponds to an identifier of the at least one alternative QoS parameter set, the at least one alternative quality of service QoS parameter set is determined based on the at least one alternative service requirement, and the second QoS notification control indication information indicates to send the indication information indicating whether the QoS requirement of the first service data flow can be guaranteed.

The policy control network element sends the fourth policy to the first session management network element.

Specifically, the application function network element provides an alternative service requirement when sending the service request to the policy control network element. The policy control network element determines an alternative QoS parameter set based on the alternative service requirement. The policy control network element may obtain the at least one alternative QoS parameter set, and obtain the identifier that is of the at least one alternative service requirement and that corresponds to the identifier of the at least one alternative QoS parameter set. Then the policy control network element generates the fourth policy, and sends the fourth policy to the first session management network element. The fourth policy includes the at least one alternative QoS parameter set and the identifier that is of the at least one alternative service requirement and that corresponds to the identifier of the at least one alternative QoS parameter set.

In some embodiments of this application, the service request further includes identification information of the first service data flow, and the fourth policy further includes the identification information of the first service data flow.

If the application function network element provides description information of a plurality of service data flows, the service request further includes the identification information of the first service data flow, and the fourth policy further includes the identification information of the first service data flow. For example, there is the first service data flow and a second service data flow, and the service request further includes the identification information of the first service data flow and identification information of the second service data flow. In at least one embodiment of this application, the service request sent by the application function network element to the policy control network element carries identification information of a service data flow. This resolves an indication problem of indicating, when there are the plurality of service data flows, whether a QoS requirement of each service flow can be guaranteed.

303: The first session management network element sends second report information to the application function network element, where the second report information includes second indication information and the identifier of the first alternative service requirement, the identifier of the first alternative service requirement corresponds to the identifier of the first alternative QoS profile, the second indication information indicates that the QoS requirement of the first service data flow cannot be guaranteed, the first QoS flow is used to transmit the first service data flow, and the first service data flow is a service data flow of an application corresponding to the application function network element.

After the first session management network element receives the first report information from the user plane network element, the first session management network element parses the first report information to obtain the first indication information and the identifier of the first alternative QoS profile by using the first report information. The first session management network element further parses the first indication information, and the first session management network element may learn that the QoS requirement of the first QoS flow cannot be guaranteed. The first session management network element may obtain, based on a correspondence between the first alternative service requirement and the first alternative QoS profile, the identifier that is of the first alternative service requirement and that corresponds to the identifier of the first alternative QoS profile. For example, the identifier of the first alternative service requirement may be a first alternative service requirement Id (AltSerId for short). The first service data flow is the service data flow of the application corresponding to the application function network element, and the first QoS flow is used to transmit the first service data flow. Therefore, the first session management network element may generate the second indication information based on the first indication information. For example, the first indication information indicates that the QoS requirement of the first QoS flow cannot be guaranteed, the first session management network element determines, because the QoS requirement of the first QoS flow cannot be guaranteed, that the QoS requirement of the first service data flow transmitted by using the first QoS flow cannot be guaranteed, and the first session management network element generates the second indication information. After obtaining the second indication information and the identifier of the first alternative service requirement, the first session management network element may generate the second report information.

The QoS requirement of the first service data flow may include one or more of a media type, a maximum requested bandwidth, a minimum requested bandwidth, a maximum supported bandwidth, a minimum expected bandwidth, a maximum packet loss rate, and a QoS reference identifier. Particularly, it is determined, based on the media type of the first service data flow, that a guaranteed bandwidth of the first service data flow cannot be guaranteed, where the second indication information indicates that the guaranteed bandwidth of the first service data flow cannot be guaranteed.

In some embodiments of this application, the second indication information is determined based on the first indication information. For example, the second indication information is generated based on indication content carried in the first indication information. The first indication information indicates that the QoS requirement of the first QoS flow cannot be guaranteed. The first session management network element determines, because the QoS requirement of the first QoS flow cannot be guaranteed, that the QoS requirement of the first service data flow transmitted by using the first QoS flow cannot be guaranteed, and includes, in the second indication information, information indicating that the QoS requirement of the first service data flow cannot be guaranteed. It may be understood that the second indication information is obtained based on the first indication information. For example, the first indication information and the second indication information may be same indication information. This is merely an example herein, and is not intended to limit at least one embodiment of this application.

It can be learned from the communication system shown in FIG. 1 that the first session management network element may communicate with the application function network element. For example, the first session management network element sends the second report information to the application function network element.

304: The application function network element receives the second report information sent by the first session management network element.

It can be learned from the communication system shown in FIG. 1 that the application function network element may communicate with the first session management network element. For example, the application function network element may receive the second report information from the first session management network element. The application function network element parses the second report information to obtain the second indication information and the identifier of the first alternative service requirement by using the second report information. The application function network element further parses the second indication information, and the application function network element may learn that the QoS requirement of the first service data flow cannot be guaranteed. The application function network element further obtains the identifier of the first alternative service requirement from the second report information, so that the application function network element can further determine the alternative service requirement. In this way, the application function network element quickly performs adjustment at an application layer based on the first alternative service requirement when determining that the QoS requirement of the first service data flow cannot be guaranteed. Therefore, a path for indicating that the QoS requirement of the first service data flow cannot be guaranteed is greatly shortened. For a service with high time sensitivity, timeliness of the second report information is high, and a delay that occurs when the application function network element performs adjustment at the application layer is reduced.

In the foregoing embodiments, the first session management network element receives the first policy from the second session management network element, and the first policy includes the information about the notification endpoint of the application function network element. Specifically, step 304 in which the first session management network element sends the second report information to the application function network element based on the first report information includes:

When the first indication information includes the identifier of the first QoS flow, the first session management network element determines the notification endpoint of the application function network element based on the identifier of the first QoS flow, and sends the second report information to the application function network element by using the notification endpoint of the application function network element.

After the first session management network element receives the first policy, the first session management network element parses the first policy to obtain the identifier of the first QoS flow and the information about the notification endpoint of the application function network element. The first session management network element determines, based on the identifier that is of the first QoS flow and that is carried in the first indication information, the notification endpoint that is of the application function network element and that is carried in the first policy, and sends the second report information to the notification endpoint, so that the application function network element can receive the second report information from the first session management network element. In at least one embodiment of this application, the first session management network element may send the second report information to the application function network element by using the notification endpoint of the application function network element, so that communication between the first session management network element and the application function network element is implemented. In this way, the application function network element can quickly receive the second report information, and perform adjustment at the application layer based on the second report information, so that a transmission delay of the second report information is reduced.

In the foregoing embodiments, the first session management network element receives the first policy from the second session management network element, and the first policy includes the information about the notification endpoint of the application function network element. Specifically, step 304 in which the first session management network element sends the second report information to the application function network element based on the first report information includes:

When the first indication information includes the identifier of the first QoS flow, the first session management network element determines the notification endpoint of the local network exposure function network element based on the identifier of the first QoS flow, and sends the second report information to the local network exposure function network element by using the notification endpoint of the local network exposure function network element, where the second report information is sent by the local network exposure function network element to the application function network element.

After the first session management network element receives the first policy, the first session management network element parses the first policy to obtain the identifier of the first QoS flow and the information about the notification endpoint of the local network exposure function network element. The first session management network element determines, based on the identifier that is of the first QoS flow and that is carried in the first indication information, the notification endpoint that is of the local network exposure function network element and that is carried in the first policy, and sends the second report information to the notification endpoint, so that the local network exposure function network element can receive the second report information from the first session management network element, and the local network exposure function network element sends the second report information to the application function network element. In at least one embodiment of this application, the first session management network element may send the second report information to the local network exposure function network element by using the notification endpoint of the local network exposure function network element, and then the local network exposure function network element sends the second report information to the application function network element, so that communication between the first session management network element and the application function network element is implemented. In this way, the application function network element can quickly receive the second report information, and perform adjustment at the application layer based on the second report information, so that a transmission delay of the second report information is reduced.

In some embodiments of this application, the terminal device may be further handed over. For example, the terminal device is handed over from the first access network element to the second access network element. The first access network element may be the radio access network in which the terminal device is located before the handover, and the second access network element may be a radio access network in which the terminal device is located after the handover. After step 304 in which the first session management network element sends the second report information to the application function network element, the report information sending method provided in at least one embodiment of this application further includes the following steps.

When the terminal device is handed over from the first access network element to the second access network element, the first session management network element receives, from the second access network element, identification information of a QoS flow, where the identification information of the QoS flow includes the identifier of the first QoS flow.

The first session management network element sends third report information to the application function network element, where the third report information includes third indication information, and the third indication information indicates that the QoS requirement of the first service data flow cannot be guaranteed.

When the terminal device is handed over from the first access network element to the second access network element, the second access network element may further send the identification information of the QoS flow to the first session management network element. For example, an N2 interface is established between the second access network element and the AMF, the N11 interface is established between the AMF and the first session management network element, and the first session management network element receives, from the second access network element, the identification information of the QoS flow, where the identification information of the QoS flow includes the identifier of the first QoS flow, and the first QoS flow is used to transmit the first service data flow. The first session management network element may send the third report information to the application function network element, where the third report information includes the third indication information, and the third indication information indicates that the QoS requirement of the first service data flow cannot be guaranteed. In at least one embodiment of this application, when the terminal device is handed over, the application function network element may alternatively receive the third report information from the first session management network element, and perform adjustment at the application layer based on the third report information, so that a transmission delay of the third report information is reduced.

In some embodiments of this application, the terminal device may be further handed over. For example, the terminal device is handed over from the first access network element to the second access network element. The first access network element may be the radio access network in which the terminal device is located before the handover, and the second access network element may be a radio access network in which the terminal device is located after the handover. The report information sending method provided in at least one embodiment of this application further includes the following step.

The first session management network element receives, from the second access network element, an identifier of a second alternative QoS profile corresponding to the first QoS flow.

Third report information further includes an identifier of a second alternative service requirement, and the identifier of the second alternative service requirement corresponds to the identifier of the second alternative QoS profile.

Specifically, when the QoS requirement of the first QoS flow cannot be guaranteed, the second access network element may further send, to the first session management network element, the identifier of the second alternative QoS profile corresponding to the first QoS flow. The second alternative QoS profile is also an alternative QoS profile that satisfies the QoS requirement of the first QoS flow. In this case, the first session management network element may further determine the second alternative QoS profile that satisfies the QoS requirement of the first QoS flow, and the first session management network element may determine, based on the correspondence between the alternative QoS profile and the alternative service requirement, the identifier that is of the second alternative service requirement and that corresponds to the identifier of the second alternative QoS profile. The first session management network element sends the third report information to the application function network element. In addition to including third indication information, the third report information further includes the identifier of the second alternative service requirement, so that the application function network element can obtain the second alternative QoS profile that satisfies the QoS requirement of the first QoS flow, and a report indication problem that occurs when there are a plurality of alternative QoS profiles is resolved.

In some embodiments of this application, the second report information further includes the identification information of the first service data flow.

In some embodiments of this application, the third report information further includes the identification information of the first service data flow.

The application function network element may receive the second report information or the third report information from the first session management network element. If the application function network element provides the description information of the plurality of service data flows, for example, when there is an indication indicating whether the QoS requirement of the first service data flow and a QoS requirement of the second service data flow can be guaranteed, the second report information and the third report information that are sent by the first session management network element need to carry the identification information of the first service data flow and the identification information of the second service data flow. In at least one embodiment of this application, the report information sent by the first session management network element to the application function network element carries the identification information of the service data flow, so that the indication problem of indicating, when there are the plurality of service data flows, whether the QoS requirement of each service flow can be guaranteed is resolved.

It can be learned from the example descriptions of this application in the foregoing embodiments that the first session management network element receives the first report information from the user plane network element, where the first report information includes the first indication information and the identifier of the first alternative QoS profile, and the first indication information indicates that the QoS requirement of the first QoS flow cannot be guaranteed. The first session management network element sends the second report information to the application function network element, where the second report information includes the second indication information and the identifier of the first alternative service requirement, the identifier of the first alternative service requirement corresponds to the identifier of the first alternative QoS profile, the second indication information indicates that the QoS requirement of the first service data flow cannot be guaranteed, the first QoS flow is used to transmit the first service data flow, and the service data flow is the service data flow of the application corresponding to the application function network element. Because the first session management network element may receive the first report information from the user plane network element, and the first report information carries the first indication information and the identifier of the first QoS profile, the first session management network element may obtain the second indication information based on the first indication information, and may further determine the identifier of the first alternative service requirement based on the identifier of the first alternative QoS profile. Therefore, the first session management network element may generate the second report information. The first session management network element sends the second report information to the application function management network element, and the second indication information in the second report information indicates that the QoS requirement of the first service data flow cannot be guaranteed. In at least one embodiment of this application, based on a path "the user plane network element—the first session management network element—the application function network element", the application function network element can determine that the QoS requirement of the first service data flow cannot be guaranteed. In addition, the second report information further carries the identifier of the first alternative service requirement, so that the application function network element can further determine an alternative service requirement. In this way, the application function network element quickly performs adjustment at the application layer based on the first alternative service requirement when determining that the QoS requirement of the first service data flow cannot be guaranteed. Therefore, the path for indicating that the QoS requirement of the first service data flow cannot be guaranteed is greatly shortened. For the service with the high time sensitivity, the timeliness of the second report information is high, and the delay that occurs when the application function network element performs adjustment at the application layer is reduced.

To better understand and implement the foregoing solutions in embodiments of this application, the following uses corresponding application scenarios as examples for specific description.

Figure 4A:
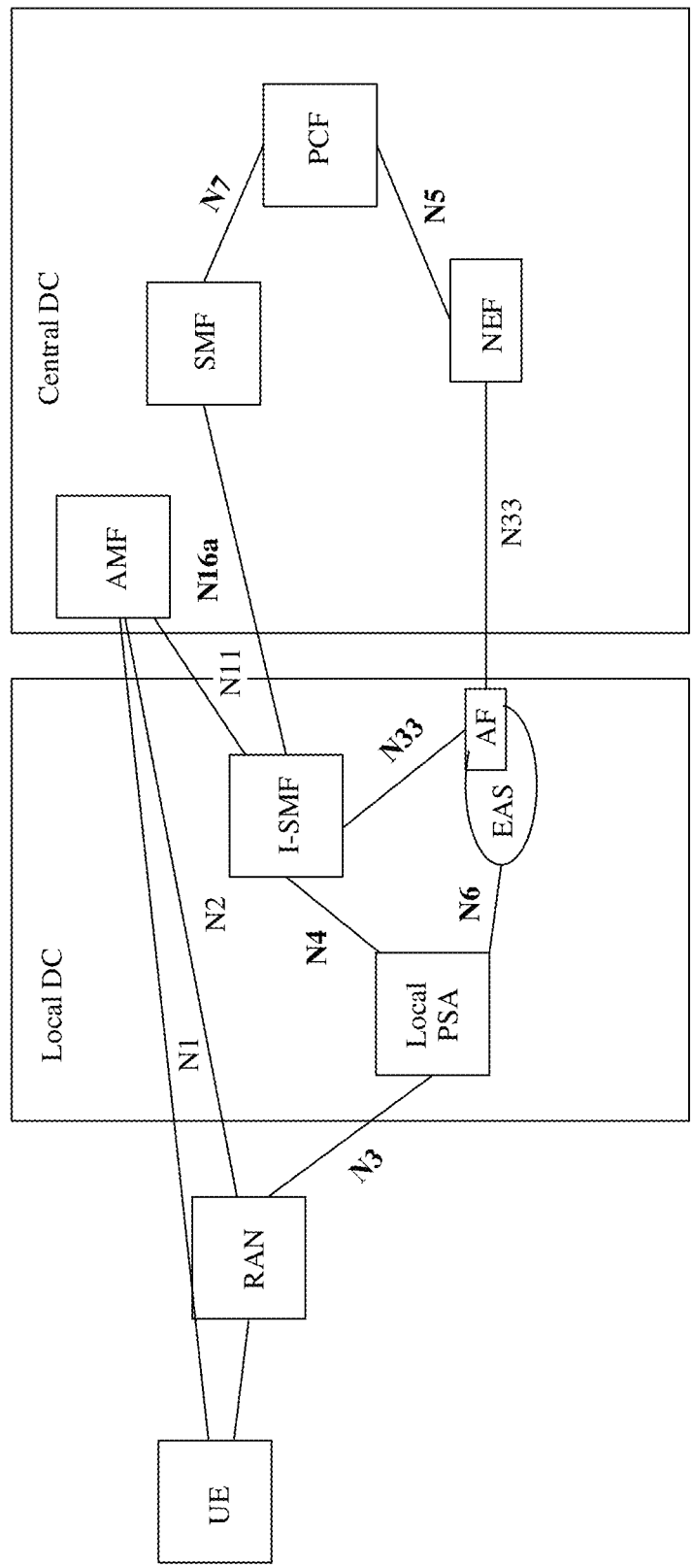
FIG. 4a is a schematic diagram of an application system architecture of a communication system according to at least one embodiment of this application.
Figure 4B:
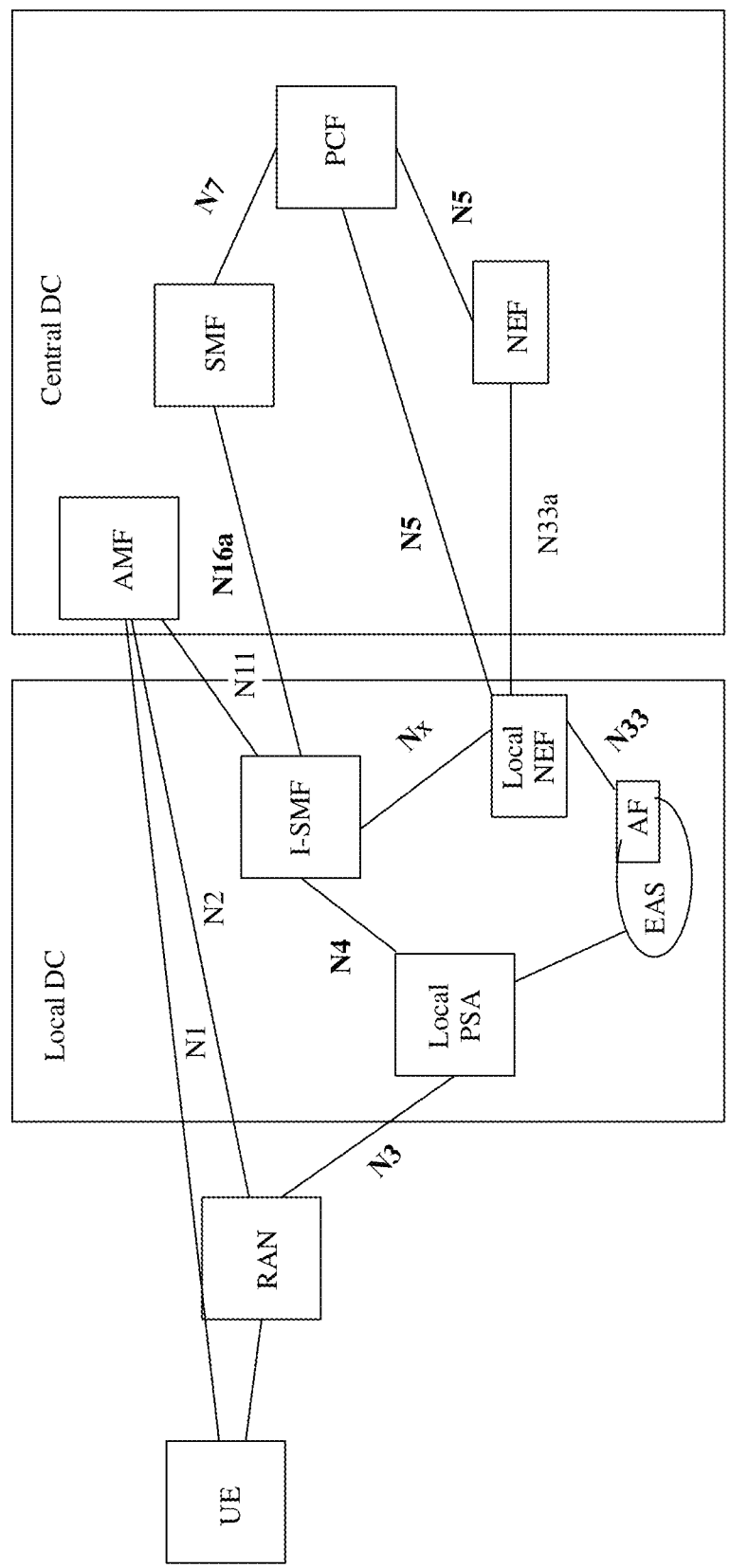
FIG. 4b is a schematic diagram of an application system architecture of another communication system according to at least one embodiment of this application.
Figure 4C:
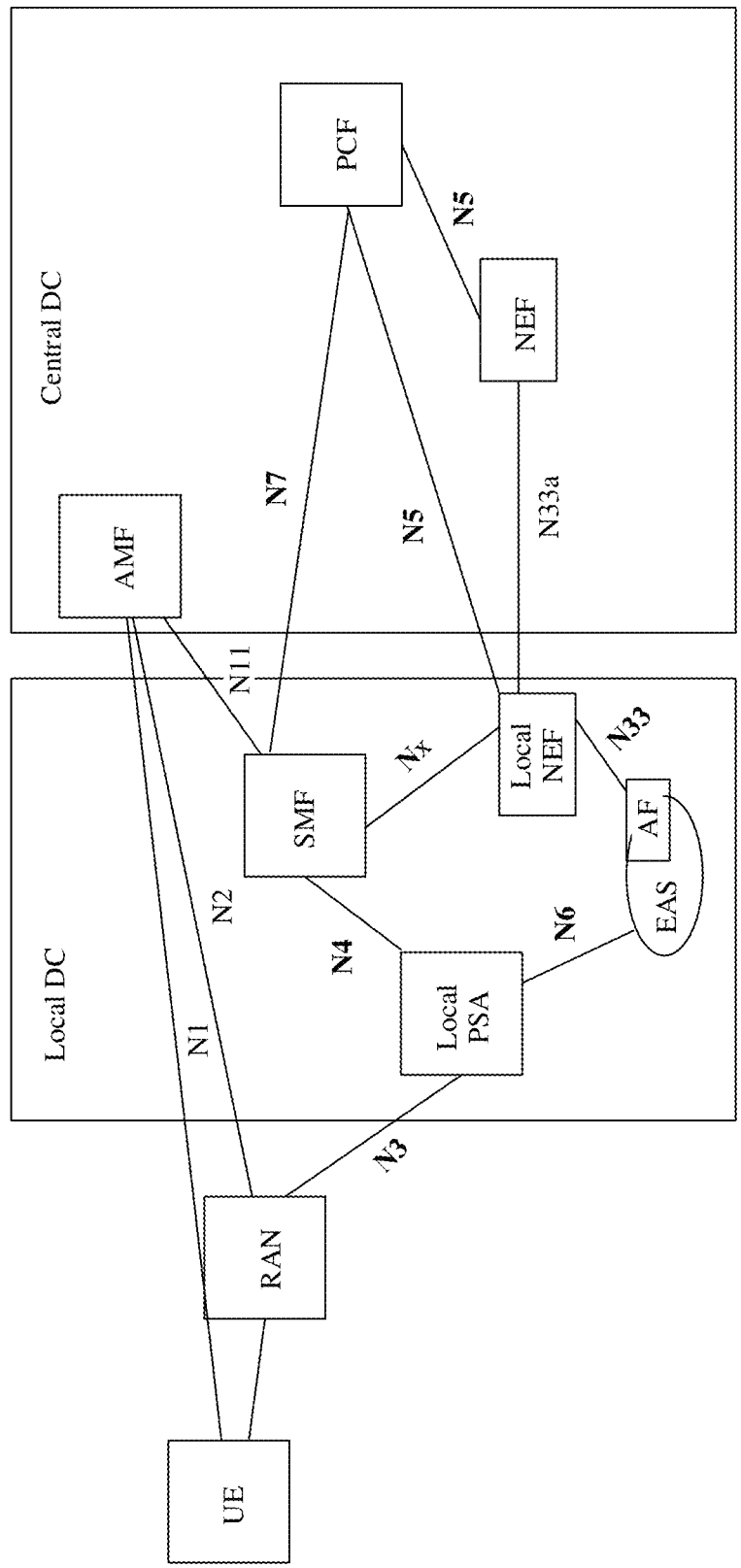
FIG. 4c is a schematic diagram of an application system architecture of another communication system according to at least one embodiment of this application.

Based on the communication system shown in FIG. 1, the following describes different application scenarios of the communication system by using examples. For example, FIG. 4a to FIG. 4c show three specific application scenarios of the communication system shown in FIG. 1. In subsequent embodiments, an example in which the first session management network element is an I-SMF, the user plane network element is a local PSA, and the application function network element is an AF is used for description.

FIG. 4a is a schematic diagram of a framework of an application scenario of the communication system according to at least one embodiment of this application. The I-SMF is deployed in a local data center (local data center), the I-SMF supports interworking with the AF through an N33 interface and interworking with the local PSA through an N4 interface. Specifically, the communication system may include UE, a RAN, the local PSA, the AF, the I-SMF, an AMF, an SMF, a PCF, and an NEF. An N1 interface is configured between the AMF and the UE, an N2 interface is configured between the AMF and the RAN, an N3 interface is configured between the RAN and the local PSA, an N11 interface is configured between the AMF and the I-SMF, the N4 interface is configured between the I-SMF and the local PSA, an N16a interface is configured between the I-SMF and the SMF, the N33 interface is configured between the I-SMF and the AF, an N6 interface is configured between the AF and the local PSA, an N33 interface is configured between the AF and the NEF, an N5 interface is further configured between the NEF and the PCF, and an N7 interface is configured between the PCF and the SMF.

FIG. 4b is a schematic diagram of a framework of an application scenario of the communication system according to at least one embodiment of this application. A local NEF and the I-SMF are locally deployed, and the local NEF supports interworking with the AF through an N33 interface, interworking with an NEF through an N33a interface, interworking with a PCF through an N5 interface, or interworking with the I-SMF through an Nx interface. Specifically, the communication system may include UE, a RAN, the local PSA, the AF, the I-SMF, an AMF, the local NEF, an SMF, the PCF, and the NEF. An N1 interface is configured between the AMF and the UE, an N2 interface is configured between the AMF and the RAN, an N3 interface is configured between the RAN and the local PSA, an N11 interface is configured between the AMF and the I-SMF, an N4 interface is configured between the I-SMF and the local PSA, an N16a interface is configured between the I-SMF and the SMF, the Nx interface is configured between the I-SMF and the local NEF, the N33 interface is configured between the local NEF and the AF, an N6 interface is configured between the AF and the local PSA, an N33 interface is configured between the local NEF and the NEF, the N5 interface is further configured between the local NEF and the PCF, an N5 interface is further configured between the NEF and the PCF, and an N7 interface is configured between the PCF and the SMF.

FIG. 4c is a schematic diagram of a framework of an application scenario of the communication system according to at least one embodiment of this application. An SMF is deployed in a local data center. Specifically, the communication system may include UE, a RAN, the local PSA, the AF, the I-SMF, an AMF, a local NEF, a PCF, and an NEF. An N1 interface is configured between the AMF and the UE, an N2 interface is configured between the AMF and the RAN, an N3 interface is configured between the RAN and the local PSA, an N11 interface is configured between the AMF and the I-SMF, an N4 interface is configured between the I-SMF and the local PSA, an N7 interface is configured between the I-SMF and the PCF, an Nx interface is configured between the I-SMF and the local NEF, an N33 interface is configured between the local NEF and the AF, an N6 interface is configured between the AF and the local PSA, an N33 interface is configured between the local NEF and the NEF, an N5 interface is further configured between the local NEF and the PCF, and an N5 interface is further configured between the NEF and the PCF.

FIG. 4a to FIG. 4c each are a schematic diagram of a next-generation mobile network architecture according to at least one embodiment of this application. Embodiments of this application may be applied to the next-generation mobile network architecture. The following describes main network elements in embodiments of this application.

A RAN is configured to implement a radio-related function.

An access and mobility management function (access and mobility management function, AMF) is responsible for user mobility management, including mobility status management, temporary user identity allocation, and user authentication and authorization.

An SMF is responsible for UPF network element selection, UPF network element reselection, and IP address allocation, and is responsible for bearer establishment, modification, and release, and QoS control. Specifically, the SMF may be deployed in a central data center, and an I-SMF may be deployed in a local data center.

A UPF may be deployed in the local data center. For example, the UPF may be a local PSA. The UPF supports all or some of the following functions: interconnection between a PDU session and a data network, packet routing and transfer, and data packet detection.

A policy control function (policy control function, PCF) includes functions of policy control decision and flow-based charging control, and the functions include a user subscription data management function, a policy control function, a charging policy control function, QoS control, and the like.

An application service (application function, AF) provides an application-layer service for UE. When providing the service for the UE, the AF has requirements on a quality of service QoS policy (Policy) and a charging (Charging) policy, and needs to notify a network. In addition, the AF also needs application-related information fed back by a core network. For example, the AF may be deployed in an EAS.

A network exposure function (network exposure function, NEF) mainly supports a network exposure function, and exposes a network capability and a service to the outside. A 3GPP network function (Network Function, NF) releases a function and an event to another NF through the NEF. The capability and the event that are exposed by the NF may be securely exposed to a third-party application. Specifically, the NEF may be deployed in the central data center, and a local NEF may be deployed in the local data center.

Figure 5A:
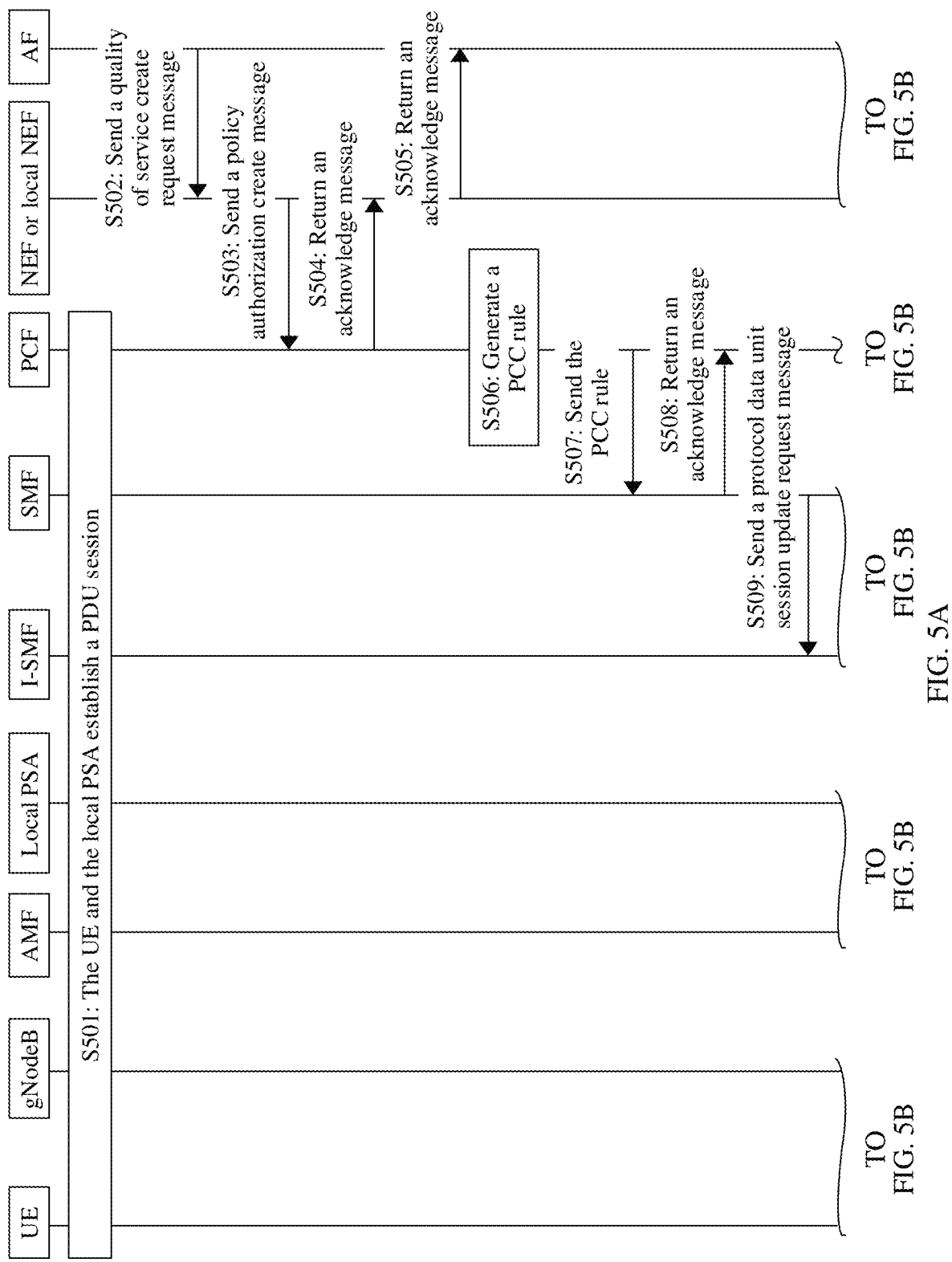
FIG. 5A and FIG. 5B are a schematic diagram of an interaction procedure of network elements in a communication system according to at least one embodiment of this application.
Figure 5B:
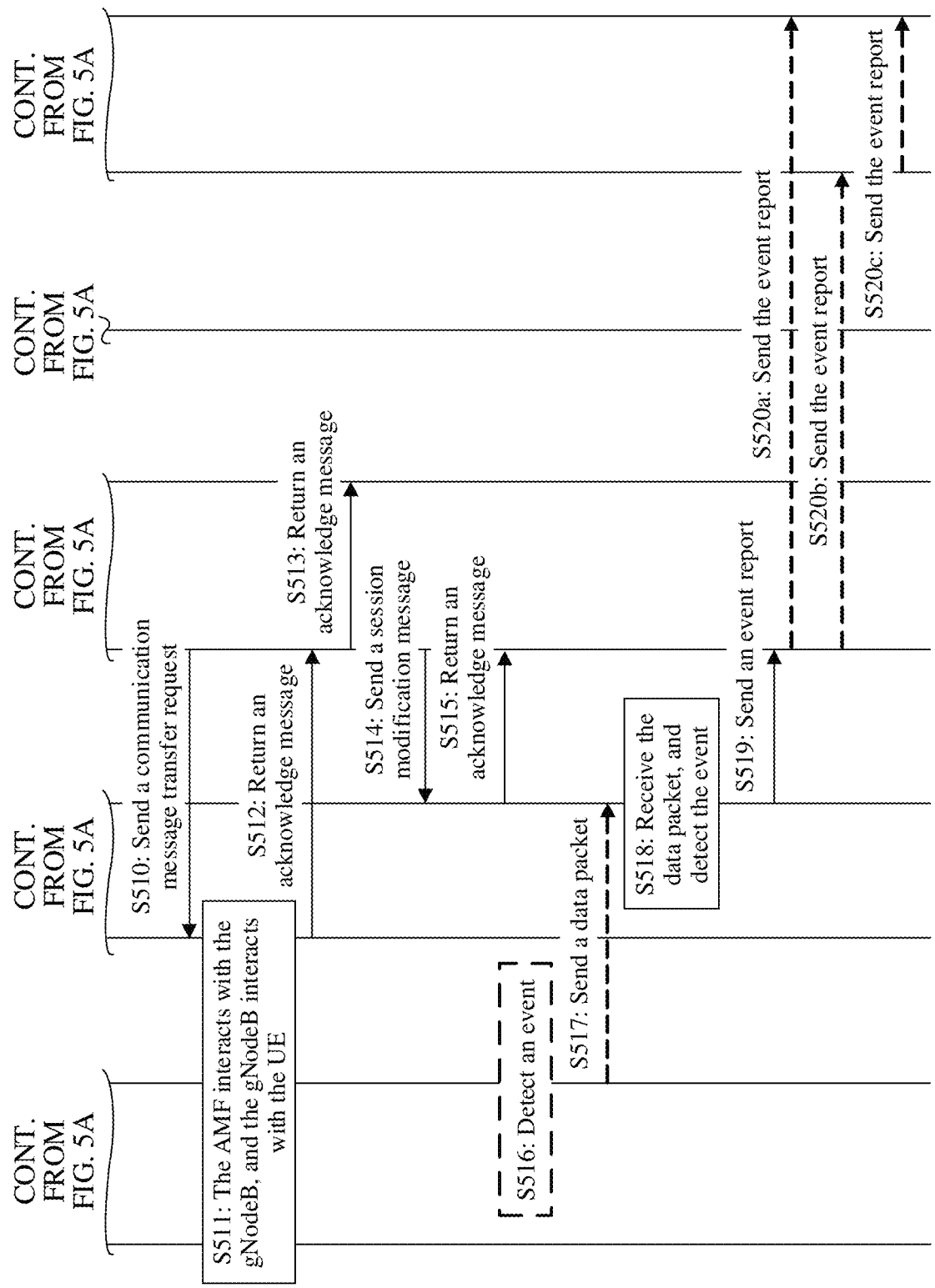
Figure 6:
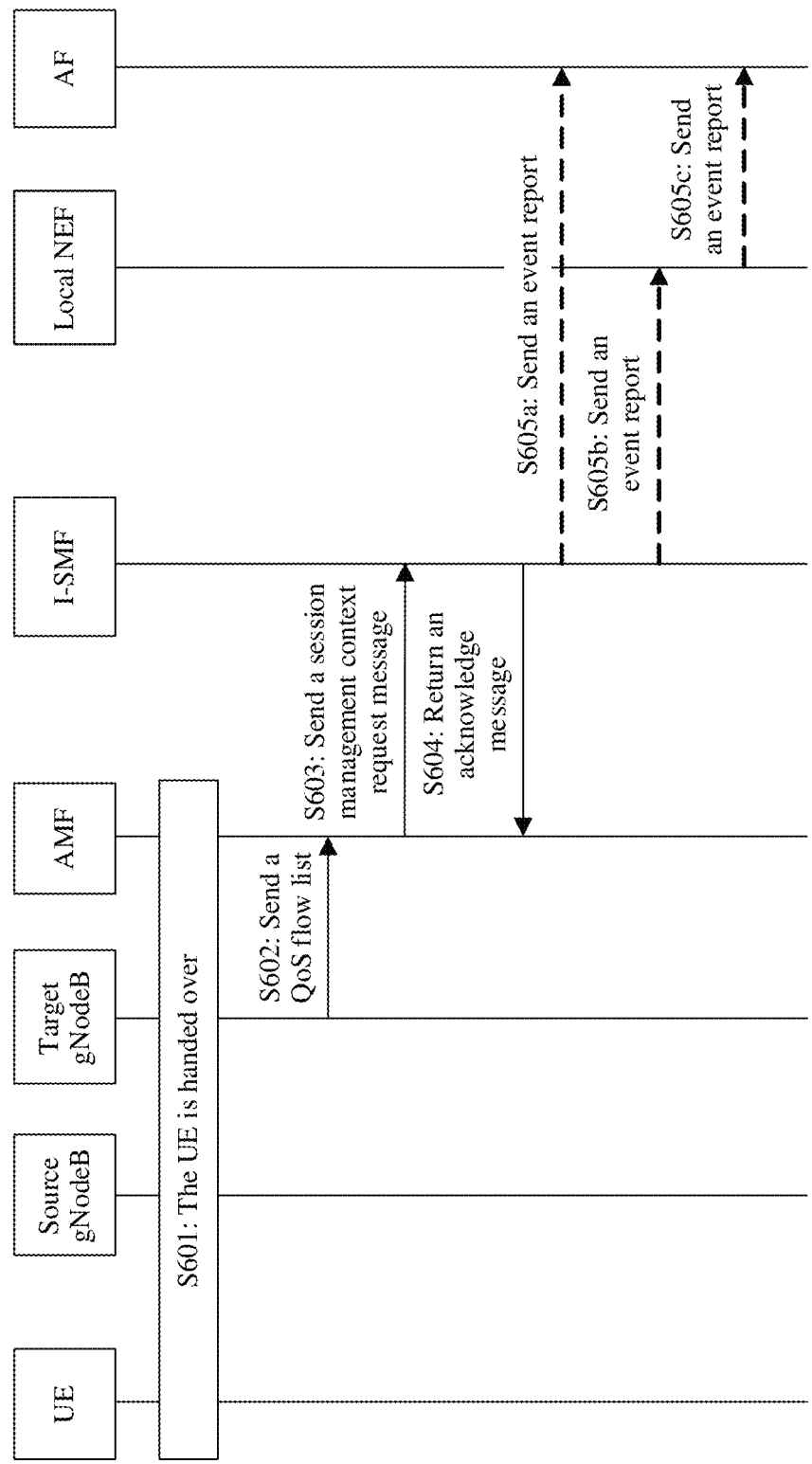
FIG. 6 is a schematic diagram of an interaction procedure of network elements in a communication system according to at least one embodiment of this application.

The following separately describes the technical solutions provided in embodiments of this application by using embodiments shown in FIG. 5A to FIG. 6. In embodiments of this application, a PCF determines, based on an identifier (AF Id) of an application function network element, a notification endpoint, or a local report indication, to include the notification endpoint, QoS notification control information, an alternative QoS parameter set (Parameter Set), and a correspondence between an AltQosId and an AltSerId in a PCC rule. Each alternative QoS parameter set includes one AltQosId and a corresponding alternative parameter. The QoS Notification Control information is used to indicate that a RAN is required to send a notification indicating whether a QoS requirement can be guaranteed. An SMF sends the QoS notification control information corresponding to the notification endpoint, the local report indication, an alternative QoS profile, and a correspondence between an AltProId and the AltSerId to an I-SMF. The SMF sends a QoS notification control event detection information to a local PSA to detect data packet information in an event report to measure a delay. When detecting a QoS notification control event, a gNodeB sends a user plane data packet to a PSA. The data packet carries a quality of service flow identifier (QFI), the QoS notification control event, and the AltProId. The local PSA then notifies the I-SMF. The I-SMF maps the AltProId to the AltSerId. During inter-gNodeB handover, the I-SMF determines, based on an accepted QoS flow list, that a QoS flow whose QoS requirement cannot be guaranteed before is in the list. In this case, the I-SMF determines that the QoS requirements of the QoS flow can be guaranteed again, and therefore sends, to a local NEF or the AF, a notification indicating that the QoS requirement can be guaranteed. In the foregoing interaction manner, the QoS notification control (Notification Control) event can be efficiently sent to the application function network element, so that a transmission delay is reduced.

Based on the communication system architectures in FIG. 4a to FIG. 4c, in embodiments of this application, the AF requests event detection by using the local NEF or directly by using the NEF. For example, an event may be a QoS notification control event. For the QoS notification control event, the RAN sends a detected QoS notification control event report to the local PSA through a user plane. The local PSA then sends the report to the I-SMF, and the I-SMF directly sends the report to the AF or the local NEF. As shown in FIG. 5A and FIG. 5B, the following interaction process is mainly included.

S501: The UE and the local PSA establishes a PDU session.

A gNodeB stores core network tunnel information (CN Tunnel Info) that is of the local PSA and that is used to receive an uplink data packet. The CN tunnel Info usually includes an IP address and a tunnel identifier (TEID) that are for receiving uplink data.

S502: If no local NEF is deployed locally, the AF sends a quality of service create request message to the NEF. For example, the quality of service create request message may be an Nnef_AFsessionWithQoS_Create request message. The Nnef_AFsessionWithQoS_Create request message includes an identifier (AF Id) of the application function network element, an address of the UE, requested service information (where for example, the service information includes service data flow description information and a QoS requirement of a service), an event identifier (where for example, the event identifier may be an identifier of the QoS notification control event), and a notification endpoint (Notification Endpoint 1a). The notification endpoint 1a includes a notification target address, namely, a notification target address 1a, for receiving an event notification, or the notification target address 1a and a notification correlation Id 1a. The AF may provide description information of a plurality of service data flows, and identify the service data flows by using data flow identifiers.

If the local NEF is deployed locally, the AF sends an Nnef_AFsessionWithQoS_Create request message to the local NEF, where the Nnef_AFsessionWithQoS_Create request message includes an AF Id, an address of the UE, an event identifier (where for example, the event identifier may be an identifier of the QoS notification control event), and a notification endpoint, namely, a notification endpoint 1a. The notification endpoint 1a includes a notification target address, namely, a notification target address 1a, for receiving an event notification, or the notification target address 1a and a notification correlation Id 1a. The local NEF determines a notification endpoint 1b, and maintains a correspondence with the notification endpoint 1a. The local NEF may further need to send an Nnef_AFsessionWithQoS_Create request message to the NEF, where the Nnef_AFsessionWithQoS_Create request message needs to carry the information received in step S502, and the Nnef_AFsessionWithQoS_Create request needs to carry the notification endpoint 1b.

For the QoS notification control event, the service information by the AF may further include alternative service requests (Alternative Service Requirements). Each alternative service requirement uses one alternative service requirement Id (AltSerId for short).

S503: The local NEF or the NEF sends a policy authorization create message to the PCF. For example, the policy authorization create message may be an Npcf_PolicyAuthorization_Create message. The Npcf_PolicyAuthorization_Create message includes the AF Id, the address of the UE, the requested service information, and the event identifier (for example, the event identifier may be the identifier of the QoS notification control event), and information about the notification endpoint. If no local NEF is deployed, the information about the notification endpoint may be the notification endpoint 1a. Alternatively, if the local NEF is deployed, the information about the notification endpoint may be the notification endpoint 1b.

For the QoS notification control event, the service information by the AF may further include the alternative service requirements. Each alternative service requirement uses the alternative service requirement Id (AltSerId for short).

The Npcf_PolicyAuthorization_Create message further carries local report indication information, indicating that an event needs to be locally reported.

S504: After storing the received policy authorization create message, the PCF returns an acknowledge message to the local NEF or the NEF.

S505: The local NEF or the NEF returns an acknowledge message to the AR

S506: The PCF performs policy decision based on the received information, to generate a PCC rule. For example, the PCC rule is formulated for the PDU session established in step S501. The PCC rule includes service information, and the service information may include a service data flow template and a QoS parameter. The PCF determines, based on the AF ID, the notification endpoint 1a/notification endpoint 1b, or a local report indication, to include the notification endpoint 1a or the notification endpoint 1b in the PCC rule. Optionally, the PCF may alternatively include an explicit local report indication in the PCC rule. In at least one embodiment, the notification endpoint 1a/notification endpoint 1b and an explicit local report indication may alternatively be carried in the PCC rule, to indicate that the SMF needs to locally report the event. The SMF may still report the event to the PCF through a control plane. This is not limited. The PCF may formulate different PCC rules based on the description information of the plurality of service data flows. In this case, the PCF further includes corresponding service data flow identifiers in the PCC rules.

For the QoS notification control event, if a request message carries the alternative service requirements, the PCF further includes alternative QoS parameter sets in the PCC rule based on the alternative service requirements. Each alternative QoS parameter set is identified by using one alternative QoS parameter set Id (AltQosId for short). In addition, the PCC rule includes a correspondence between the AltQosId and the AltSerId.

S507: The PCF sends the PCC rule to the SMF corresponding to the PDU session.

S508: After installing the PCC rule, the SMF returns an acknowledge message to the PCF.

S509: After executing the PCC rule, and binding a QoS flow based on a QoS parameter carried in the PCC rule, the SMF determines to create or modify the QoS flow, and the SMF sends a protocol data unit session update request message to the I-SMF. For example, the protocol data unit session update request message may be an Nsmf_PDUSession_Update request message. If a new QoS flow is created, the SMF may allocate an identifier of the QoS flow to the QoS flow, formulate a corresponding QoS profile (profile) based on the QoS parameter in the PCC rule, and send the identifier of the QoS flow and the corresponding QoS profile to the I-SMF. If an existing QoS flow is modified, the SMF does not need to allocate an identifier to a QoS flow obtained through modification, but needs to modify a created QoS profile. The SMF sends, to the I-SMF, a QFI and a QoS profile obtained through modification. The SMF may further send a message of the notification endpoint to the I-SMF. If the PCF provides a plurality of PCC rules, the SMF may bind different PCC rules to different QoS flows. In this case, the SMF sends identifiers of the QoS flows and a correspondence between notification endpoints and service data flow identifiers to the I-SMF based on a binding result.

For the QoS notification control event, the protocol data unit session update request message includes a QoS notification control indication and the local report indication information, which are used to indicate that the event needs to be reported locally or the event needs to be reported through the user plane. In at least one embodiment, the local report indication information is carried in the protocol data unit session update request message, and is used to indicate the gNodeB to report the event through the user plane, but it is not excluded that the gNodeB reports the event through the control plane. In addition, if the PCC rule carries the alternative QoS parameter sets, the SMF determines alternative QoS profiles based on the alternative QoS parameter sets. Each alternative QoS profile is identified by using an alternative QoS profile Id (AltProId for short). The SMF includes a correspondence between the AltProId and the AltSerId in a message.

S510: The I-SMF sends a communication message transfer request to the AMF.

For example, the communication message transfer request may be an Namf_Communication_N1N2MessageTransfer request message, and the Namf_Communication_N1N2MessageTransfer request message carries the QFI.

For the QoS notification control event, the Namf_Communication_N1N2MessageTransfer request message includes the QoS notification control indication and the local report indication information. If the message in step S509 carries an alternative QoS profile, the Namf_Communication_N1N2MessageTransfer request message further carries the alternative QoS profile.

The I-SMF stores a correspondence between the QFI and the notification endpoint.

Alternatively, the I-SMF stores a correspondence between the QFI, the notification endpoint, and service data. Further, the I-SMF stores the correspondence between the AltProId and the AltSerId.

S511: The AMF interacts with the gNodeB, and the AMF sends the information received in step S509 to the gNodeB. The gNodeB further interacts with the UE.

S512: The AMF returns an acknowledge message to the I-SMF.

S513: The I-SMF returns an acknowledge message to the SMF.

S514: The I-SMF sends a session modification message to the local PSA, where the session modification message carries the QFI.

For the QoS notification control event, the session modification message carries the QoS notification control information, indicating the local PSA to detect a data packet sent by the RAN and used to report the QoS notification control event and report the data packet to the I-SMF.

S515: The local PSA returns an acknowledge message to the I-SMF.

S516: For the QoS notification control event, if the gNodeB detects that a QoS requirement of a QoS profile of a QoS flow cannot be guaranteed, the gNodeB detects the event. In this case, if the gNodeB received alternative QoS profiles before, the gNodeB determines an alternative QoS profile that can be guaranteed currently. If a QoS of an alternative QoS profile that is being executed by the gNodeB cannot be guaranteed, the gNodeB detects the event. The gNodeB determines another alternative QoS profile that can be guaranteed currently. If the gNodeB detects that a GBR of a QoS flow can be guaranteed after sending a notification indicating that a QoS requirement of the QoS flow cannot be guaranteed, the gNodeB detects the event.

Optionally, that the gNodeB detects whether the QoS requirement of a QoS flow can be guaranteed may include: The gNodeB detects current actual quality of service of the QoS flow. If the current actual quality of service of the QoS flow satisfies the QoS requirement of the QoS flow, the gNodeB determines that the QoS requirement of the QoS flow can be guaranteed. Otherwise, the gNodeB determines that the QoS requirement of the QoS flow cannot be guaranteed.

For example, detecting whether a guaranteed bandwidth of the QoS flow is guaranteed is used as an example. The gNodeB may detect a minimum transmission rate of a service data flow transmitted on the QoS flow in a period of time, and determine whether the minimum transmission rate of the service data flow satisfies a guaranteed transmission rate. If the minimum transmission rate of the service data flow is greater than or equal to the guaranteed transmission rate, the gNodeB determines that the QoS requirement of the QoS flow can be guaranteed. Otherwise, if the minimum transmission rate of the service data flow is less than the guaranteed transmission rate, the gNodeB determines that the QoS requirement of the QoS flow cannot be guaranteed.

S517: The gNodeB sends a data packet to the local PSA, where the data packet carries the QFI and indication information indicating that the QoS requirement cannot be guaranteed or indication information indicating that the QoS requirement can be guaranteed. For the indication information indicating that the QoS requirement cannot be guaranteed, the gNodeB may further carry an AltProId of an alternative QoS profile that can be guaranteed. The gNodeB may include a plurality of QFIs and corresponding indication information in one data packet.

S518: The local PSA receives a data packet carrying the QoS notification control event report, and detects the event.

S519: The local PSA sends the event report to the I-SMF.

The local PSA sends, to the I-SMF, the QFI and the indication information indicating that the QoS requirement cannot be guaranteed or the indication information indicating that the QoS requirement can be guaranteed. For the indication information indicating that the QoS requirement cannot be guaranteed, the event report further includes the AltProId. The I-SMF determines the notification endpoint 1a or the notification endpoint 1b based on the QFI, and Determines the AltSerId based on the AltProId. If the I-SMF further stores a correspondence between the QFI and the service data flow identifier, the I-SMF further determines the service data flow identifier.

S520a: If no local NEF is deployed, the I-SMF sends the event report to the AF, where the event report carries the notification endpoint 1a.

The event report includes the indication information indicating that the QoS requirement cannot be guaranteed or the indication information indicating that the QoS requirement can be guaranteed. For indication information indicating that a GBR cannot be guaranteed, the event report further includes the AltSerId. The event report may further include the service data flow identifier.

S520b: If the local NEF is deployed, the I-SMF sends the event report to the local NEF, where the event report carries the notification endpoint 1b.

For QoS notification control, the event report includes the indication information indicating that the QoS requirement cannot be guaranteed or the indication information indicating that the QoS requirement can be guaranteed. For the indication information indicating that the QoS requirement cannot be guaranteed, the event report further includes the AltSerId. The event report may further include the service data flow identifier.

S520c: The local NEF further sends the event report to the AF, where the event report carries the notification endpoint 1a.

For QoS notification control, the event report includes the indication information indicating that the QoS requirement cannot be guaranteed or the indication information indicating that the QoS requirement can be guaranteed. For the indication information indicating that the QoS requirement cannot be guaranteed, the event report further includes the AltSerId. The event report may further include the service data flow identifier.

An execution procedure in the architecture in FIG. 4*b* is similar to the procedure in the architecture in FIG. 4*a*. A difference lies in that the local NEF sends a message to an NEF in the central data center, and the NEF in the central data center further sends the message to the PCF.

For the architecture in FIG. 4*c*, interaction between the I-SMF and the SMF is omitted.

The local PSA sends a notification message to the SMF, and the SMF sends the notification message to the local NEF/AF.

As shown in FIG. 6, when inter-gNodeB handover occurs, an I-SMF determines, based on a received QoS flow list, whether a QoS flow corresponding to previously sent indication information indicating that a QoS requirement cannot be guaranteed is in the QoS flow list. If the QoS flow is in the QoS flow list, a local PSA sends, to a local NEF or an AF, indication information indicating that the QoS requirement can be guaranteed. Specifically, the following procedure is mainly included.

S601: After UE moves, a network performs inter-gNodeB handover, for example, completes handover from a source gNodeB to a target (Target) gNodeB through Xn-based inter NG-RAN handover or inter NG-RAN node N2 based handover.

S602: In a handover process, the target gNodeB sends the QoS flow list to the AR For example, the target gNodeB sends a path switch request or a handover request acknowledge message. For example, the path switch request may be an N2 path switch request, and the handover request acknowledge message may be a handover request acknowledge message. The path switch request or the handover request acknowledge message includes the QoS flow list (List) accepted by the target gNodeB, where the QoS flow list includes an accepted QFI list. The QoS flow list may further include an alternative QoS profile Id (AltProId for short) of one or more accepted QoS flows.

S603: An AMF sends a session management context request message to an SMF. For example, the session management context request message may be an Nsmf_PDUSession_UpdateSMContext request message, and the Nsmf_PDUSession_UpdateSMContext request message includes the accepted QoS flow list. The QoS flow list may further include the alternative QoS profile Id (AltProId for short) of the one or more accepted QoS flows.

S604: The SMF returns an acknowledge message to the AMF.

S605*a*: If no local NEF is deployed, and the I-SMF determines that the QoS flow corresponding to the previously sent indication information indicating that the QoS requirement cannot be guaranteed is in the QoS flow list, the I-SMF determines a notification endpoint 1a based on a QFI of the QoS flow, and sends an event report to the AF, where the event report includes the indication information indicating that the QoS requirement can be guaranteed and a notification endpoint 1b. If the QFI has a corresponding AltProId, the I-SMF further includes a corresponding AltSerId in the event report. If the I-SMF further stores a correspondence between the QFI and a service data flow identifier, the I-SMF further determines the service data flow identifier, and includes the service data flow identifier in the event report.

S605*b*: If the local NEF is deployed, and the I-SMF determines that the QoS flow corresponding to the previously sent indication information indicating that the QoS requirement cannot be guaranteed is in the QoS flow list, the I-SMF determines a notification endpoint 1b based on a QFI of the QoS flow, and sends an event report to the local NEF, where the event report includes the indication information indicating that the QoS requirement can be guaranteed and the notification endpoint 1b. If the QFI has a corresponding AltProId, the I-SMF further includes a corresponding AltSerId in the event report. If the I-SMF further stores a correspondence between the QFI and a service data flow identifier, the I-SMF further determines the service data flow identifier, and includes the service data flow identifier in the event report.

S605*c*: If the local NEF is deployed, the local NEF determines a notification endpoint 1a based on a notification endpoint 1b, and sends an event report to the AF, where the event report includes the indication information indicating that the QoS requirement can be guaranteed and the notification endpoint 1b. For indication information indicating that a GBR can be guaranteed, the event report may further carry an AltSerId. The event report may further carry a service data flow identifier.

It can be learned from the foregoing example descriptions that, for the QoS notification control event, the gNodeB reports the QoS notification control event to the local PSA through the user plane, and the local PSA reports the QoS notification control event to the I-SMF. If the previously delivered alternative QoS profile further carries the AltProId, the I-SMF determines the AltSerId based on the AltProId. The I-SMF reports the event to the AF or the local AR During inter-gNodeB handover, if the I-SMF determines that the QoS flow whose GBR cannot be guaranteed before is in the list, the I-SMF sends the event in which the GBR can be guaranteed and the AltSerId to the local NEF or the AR In embodiments of this application, the I-SMF directly sends the detected QoS notification control to a local application, so that a network delay is reduced, and an event report problem during handover can further be resolved. The UPF may directly send the event report to the local application, so that route recurvation is reduced.

In the foregoing embodiments of this application, for the architecture in FIG. 4*c*, the AMF may directly interact with the SMF, and the SMF sends the notification message to the local NEF/AF. The network delay is reduced, and the event report problem during handover can further be resolved. The UPF may directly send the event report to the local application, so that the route recurvation is reduced.

It should be noted that, for brief description, the foregoing method embodiments are all expressed as a series of actions. However, a person skilled in the art should appreciate that this application is not limited to the described order of the actions, because according to this application, some steps may be performed in other orders or simultaneously. A person skilled in the art should also know that embodiments described in this specification are all example embodiments, and the related actions and modules are not necessarily required by this application.

To better implement the solutions of embodiments of this application, a related apparatus for implementing the solutions is further provided below.

Figure 7:
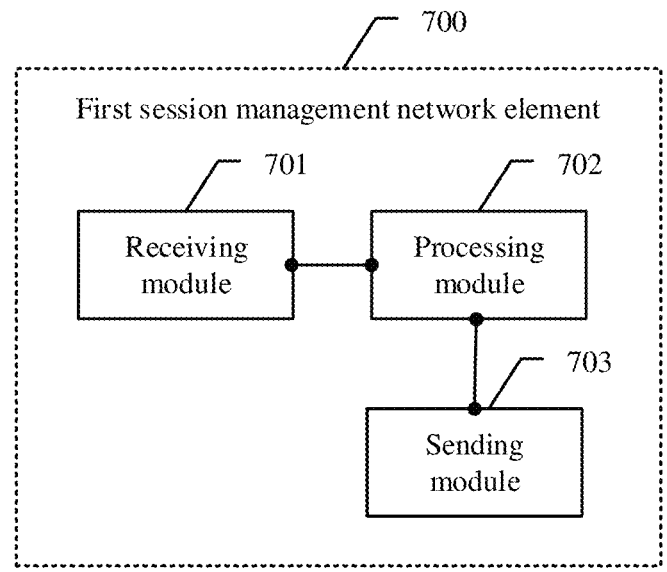
FIG. 7 is a schematic diagram of a composition structure of a first session management network element according to at least one embodiment of this application.

Refer to FIG. 7. A first session management network element 700 provided in at least one embodiment of this application may include a receiving module 701, a processing module 702, and a sending module 703.

The processing module 702 is configured to receive first report information from a user plane network element by using the receiving module 701, where the first report information includes first indication information and an identifier of a first alternative quality of service QoS profile, and the first indication information indicates that a QoS requirement of a first quality of service flow QoS flow cannot be guaranteed.

The processing module 702 is configured to send second report information to an application function network element by using the sending module 703, where the second report information includes second indication information and an identifier of a first alternative service requirement, the identifier of the first alternative service requirement corresponds to the identifier of the first alternative QoS profile, the second indication information indicates that a QoS requirement of a first service data flow cannot be guaranteed, the first QoS flow is used to transmit the first service data flow, and the first service data flow is a service data flow of an application corresponding to the application function network element.

In some embodiments of this application, the second indication information is determined based on the first indication information.

In some embodiments of this application, the processing module 702 is configured to: when the first session management network element is an intermediate session management network element, before receiving the first report information from the user plane network element, receive a first policy from a second session management network element by using the receiving module 701, where the first policy includes an identifier of the first QoS flow, first QoS notification control indication information, at least one alternative QoS profile, information about a notification endpoint of the application function network element, and an identifier that is of at least one alternative service requirement and that corresponds to an identifier of the at least one alternative QoS profile, the at least one alternative QoS profile includes the first alternative QoS profile, the identifier of the at least one alternative service requirement includes the identifier of the first alternative service requirement, and the first QoS notification control indication information indicates to send indication information indicating whether the QoS requirement of the first QoS flow can be guaranteed.

The processing module 702 is configured to determine a second policy according to the first policy, and send the second policy to a first access network element by using the sending module 703, where the second policy includes the identifier of the first QoS flow, second QoS notification control indication information, and the at least one alternative QoS profile, and the second QoS notification control indication information is determined based on the first QoS notification control indication information.

In some embodiments of this application, the processing module 702 is configured to: when the first session management network element is an intermediate session management network element, before receiving the first report information from the user plane network element, receive a first policy from a second session management network element by using the receiving module 701, where the first policy includes an identifier of the first QoS flow, first QoS notification control indication information, at least one alternative QoS profile, information about a notification endpoint of the application function network element, and an identifier that is of at least one alternative service requirement and that corresponds to an identifier of the at least one alternative QoS profile, the at least one alternative QoS profile includes the first alternative QoS profile, the identifier of the at least one alternative service requirement includes the identifier of the first alternative service requirement, and the first QoS notification control indication information indicates to send indication information indicating whether the QoS requirement of the first QoS flow can be guaranteed.

The processing module 702 is configured to determine a third policy according to the first policy, and send the third policy to the user plane network element by using the sending module 703, where the third policy is used to indicate the user plane network element to send the indication information indicating whether the QoS requirement of the first QoS flow can be guaranteed.

In some embodiments of this application, the processing module 702 is configured to: when the first indication information includes the identifier of the first QoS flow, determine the notification endpoint of the application function network element based on the identifier of the first QoS flow, and send the second report information to the application function network element by using the notification endpoint of the application function network element.

In some embodiments of this application, the processing module 702 is configured to: when the first session management network element is an intermediate session management network element, before receiving the first report information from the user plane network element, receive a first policy from a second session management network element by using the receiving module 701, where the first policy includes an identifier of the first QoS flow, first QoS notification control indication information, at least one alternative QoS profile, information about a notification endpoint of a local network exposure function network element, and an identifier that is of at least one alternative service requirement and that corresponds to an identifier of the at least one alternative QoS profile, the at least one alternative QoS profile includes the first alternative QoS profile, the identifier of the at least one alternative service requirement includes the identifier of the first alternative service requirement, and the first QoS notification control indication information indicates to send indication information indicating whether the QoS requirement of the first QoS flow can be guaranteed.

The processing module 702 is configured to: determine a second policy according to the first policy, and send the second policy to a first access network element by using the sending module 703, where the second policy includes the identifier of the first QoS flow, second QoS notification control indication information, and the at least one alternative QoS profile, and the second QoS notification control indication information is determined based on the first QoS notification control indication information.

In some embodiments of this application, the processing module 702 is configured to: when the first session management network element is an intermediate session management network element, before receiving the first report information from the user plane network element, receive a first policy from a second session management network element by using the receiving module 701, where the first policy includes an identifier of the first QoS flow, first QoS notification control indication information, at least one alternative QoS profile, information about a notification endpoint of a local network exposure function network element, and an identifier that is of at least one alternative service requirement and that corresponds to an identifier of the at least one alternative QoS profile, the at least one alternative QoS profile includes the first alternative QoS profile, the identifier of the at least one alternative service requirement includes the identifier of the first alternative service requirement, and the first QoS notification control indication information indicates to send indication information indicating whether the QoS requirement of the first QoS flow can be guaranteed.

The processing module 702 is configured to determine a third policy according to the first policy, and send the third policy to the user plane network element by using the sending module 703, where the third policy is used to indicate the user plane network element to send the indication information indicating whether the QoS requirement of the first QoS flow can be guaranteed.

In some embodiments of this application, the processing module 702 is configured to: when the first indication information includes the identifier of the first QoS flow, determine the notification endpoint of the local network exposure function network element based on the identifier of the first QoS flow, and send the second report information to the local network exposure function network element by using the notification endpoint of the local network exposure function network element, where the second report information is sent by the local network exposure function network element to the application function network element.

In some embodiments of this application, the first policy is generated by the second session management network element according to a fourth policy from a policy control network element, the fourth policy includes at least one alternative QoS parameter set and the identifier that is of the at least one alternative service requirement and that corresponds to an identifier of the at least one alternative QoS parameter set, the at least one alternative QoS parameter set is used by the second session management network element to determine the at least one alternative QoS profile, the identifier that is of the at least one alternative service requirement and that corresponds to the identifier of the at least one alternative QoS parameter set is used by the second session management network element to determine the identifier that is of the at least one alternative service requirement and that corresponds to the identifier of the at least one alternative QoS profile, and the identifier of the at least one alternative service requirement includes the identifier of the first alternative service requirement.

In some embodiments of this application, the processing module 702 is configured to: before receiving the first report information from the user plane network element, receive a fourth policy from a policy control network element by using the receiving module 701, where the fourth policy includes at least one alternative QoS parameter set and an identifier that is of at least one alternative service requirement and that corresponds to an identifier of the at least one alternative QoS parameter set, and the identifier of the at least one alternative service requirement includes the identifier of the first alternative service requirement.

The processing module 702 is configured to determine at least one alternative QoS profile based on the at least one alternative QoS parameter set, and determine the identifier that is of the at least one alternative service requirement and that corresponds to an identifier of the at least one alternative QoS profile.

In some embodiments of this application, the processing module 702 is configured to: after sending the second report information to the application function network element, when a terminal device is handed over from the first access network element to a second access network element, receive, from the second access network element, identification information of a QoS flow by using the receiving module 701, where the identification information of the QoS flow includes the identifier of the first QoS flow. The sending module 703 sends third report information to the application function network element, where the third report information includes third indication information, and the third indication information indicates that the QoS requirement of the first service data flow cannot be guaranteed.

In some embodiments of this application, the processing module 702 is configured to receive, from the second access network element by using the receiving module 701, an identifier of a second alternative QoS profile corresponding to the first QoS flow.

The third report information further includes an identifier of a second alternative service requirement, and the identifier of the second alternative service requirement corresponds to the identifier of the second alternative QoS profile.

In some embodiments of this application, the second report information further includes identification information of the first service data flow.

In some embodiments of this application, the third report information further includes the identification information of the first service data flow.

Figure 8:
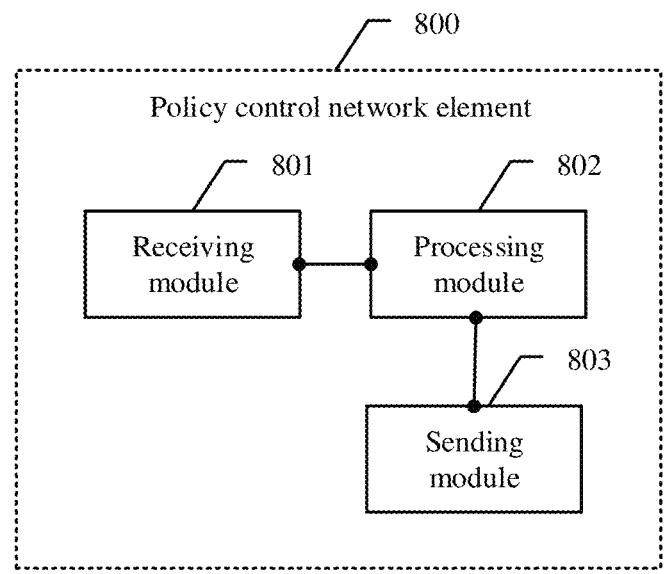
FIG. 8 is a schematic diagram of a composition structure of an application function network element according to at least one embodiment of this application.

Refer to FIG. 8. A policy control network element 800 provided in at least one embodiment of this application may include a receiving module 801, a processing module 802, and a sending module 803.

The processing module 802 is configured to receive a service request from an application function network element by using the receiving module 801, where the service request includes first quality of service QoS notification control indication information and at least one alternative service requirement, and the first QoS notification control indication information indicates to send indication information indicating whether a QoS requirement of a first service data flow can be guaranteed.

The processing module 802 is configured to generate a fourth policy based on the service request, where the fourth policy includes second QoS notification control indication information, at least one alternative QoS parameter set, and an identifier of that is of the at least one alternative service requirement and that corresponds to an identifier of the at least one alternative QoS parameter set, the at least one alternative quality of service QoS parameter set is determined based on the at least one alternative service requirement, and the second QoS notification control indication information indicates to send the indication information indicating whether the QoS requirement of the first service data flow can be guaranteed.

The processing module 802 is configured to send the fourth policy to a first session management network element by using the sending module 803.

In some embodiments of this application, the service request further includes identification information of the first service data flow, and the fourth policy further includes the identification information of the first service data flow.

It should be noted that, content such as information exchange between the modules/units of the apparatuses and the execution processes thereof is based on the same idea as the method embodiments of this application, and produces the same technical effects as the method embodiments of this application. For specific content, refer to the foregoing descriptions in the method embodiments of this application. Details are not described herein again.

At least one embodiment of this application further provides a non-transitory computer storage medium. The computer storage medium stores a program. The program is executed to perform some or all of the steps recorded in the method embodiments.

Figure 9:
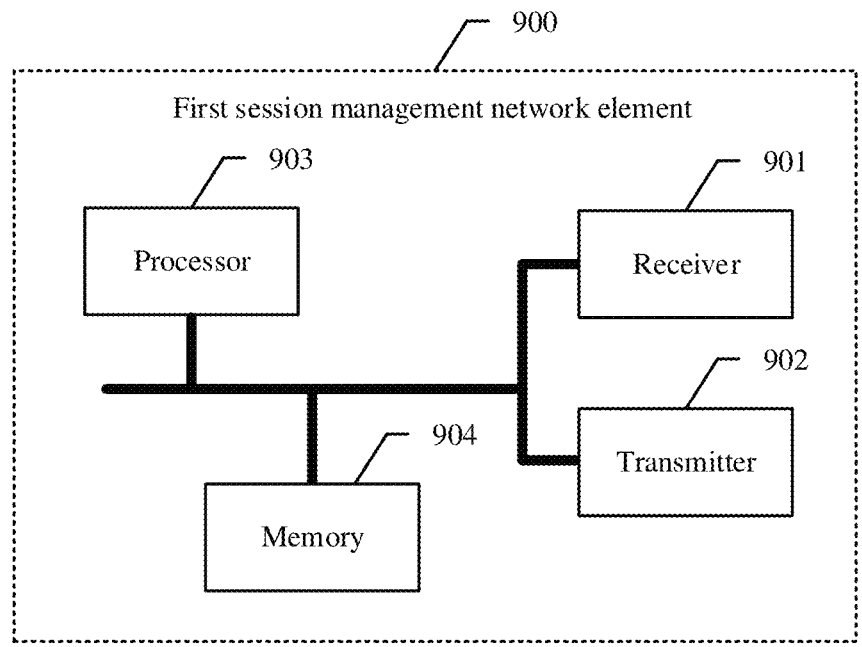
FIG. 9 is a schematic diagram of a composition structure of another first session management network element according to at least one embodiment of this application.

The following describes another first session management network element provided in at least one embodiment of this application. In FIG. 9, the first session management network element 900 includes:

a receiver 901, a transmitter 902, a processor 903, and a memory 904 (where there may be one or more processors 903 in the first session management network element 900, and an example in which there is one processor is used in FIG. 9). In some embodiments of this application, the receiver 901, the transmitter 902, the processor 903, and the memory 904 may be connected by using a bus or in another manner. In FIG. 9, a connection by using the bus is used as an example.

The memory 904 may include a read-only memory and a random access memory, and provide instructions and data for the processor 903. A part of the memory 904 may further include a non-volatile random access memory (non-volatile random access memory, NVRAM). The memory 904 stores an operating system and an operation instruction, an executable module or a data structure, or a subset thereof or an extended set thereof. The operation instruction may include various operation instructions for implementing various operations. The operating system may include various system programs for implementing various basic services and processing hardware-based tasks.

The processor 903 controls an operation of the first session management network element, and the processor 903 may also be referred to as a central processing unit (central processing unit, CPU). During specific application, components of the first session management network element are coupled together through a bus system. In addition to including a data bus, the bus system further includes a power bus, a control bus, a status signal bus, and the like. However, for clear description, various buses in the figure are referred to as the bus system.

The methods disclosed in the foregoing embodiments of this application may be applied to the processor 903, or may be implemented by the processor 903. The processor 903 may be an integrated circuit chip, and has a signal processing capability. In an implementation process, the steps in the foregoing methods may be implemented by using a hardware integrated logic circuit in the processor 903 or by using instructions in a form of software. The processor 903 may be a general-purpose processor, a digital signal processor (digital signal processing, DSP), an application specific integrated circuit (application specific integrated circuit, ASIC), a field-programmable gate array (field-programmable gate array, FPGA) or another programmable logic device, a discrete gate or transistor logic device, or a discrete hardware component. The processor 903 may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly performed and completed by using a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 904, and the processor 903 reads information in the memory 904, and completes the steps in the foregoing methods in combination with hardware of the processor 903.

The receiver 901 may be configured to receive input digits or character information, and generate signal input that is related to related setting of the first session management network element and function control. The transmitter 902 may include a display device such as a display screen. The transmitter 902 may be configured to output the digits or the character information through an external interface.

In at least one embodiment of this application, the processor 903 is configured to perform the foregoing report information sending method performed by the first session management network element.

Figure 10:
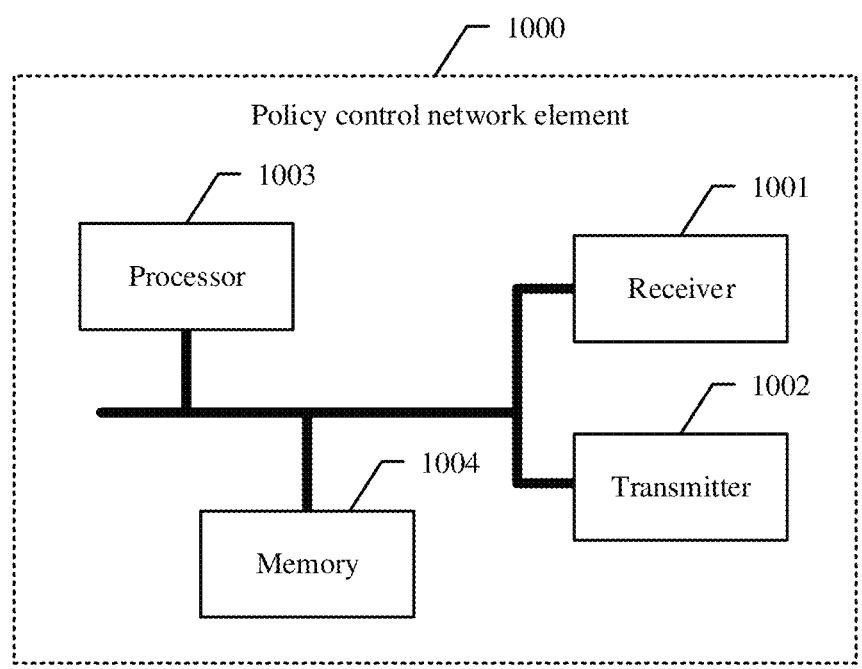
FIG. 10 is a schematic diagram of a composition structure of another application function network element according to at least one embodiment of this application.

The following describes another policy control network element provided in at least one embodiment of this application. In FIG. 10, the policy control network element 1000 includes:

a receiver 1001, a transmitter 1002, a processor 1003, and a memory 1004 (where there may be one or more processors 1003 in the policy control network element 1000, and an example in which there is one processor is used in FIG. 10). In some embodiments of this application, the receiver 1001, the transmitter 1002, the processor 1003, and the memory 1004 may be connected by using a bus or in another manner. In FIG. 10, a connection by using the bus is used as an example.

The memory 1004 may include a read-only memory and a random access memory, and provide instructions and data for the processor 1003. A part of the memory 1004 may further include an NVRAM. The memory 1004 stores an operating system and an operation instruction, an executable module or a data structure, or a subset thereof or an extended set thereof. The operation instruction may include various operation instructions for implementing various operations. The operating system may include various system programs for implementing various basic services and processing hardware-based tasks.

The processor 1003 controls an operation of the policy control network element, and the processor 1003 may also be referred to as a CPU. During specific application, components of the policy control network element are coupled together through a bus system. In addition to including a data bus, the bus system further includes a power bus, a control bus, a status signal bus, and the like. However, for clear description, various buses in the figure are referred to as the bus system.

The methods disclosed in the foregoing embodiments of this application may be applied to the processor 1003, or may be implemented by the processor 1003. The processor 1003 may be an integrated circuit chip, and has a signal processing capability. In an implementation process, the steps in the foregoing methods may be implemented by using a hardware integrated logic circuit in the processor 1003 or by using instructions in a form of software. The foregoing processor 1003 may be a general-purpose processor, a DSP, an ASIC, an FPGA, or another programmable logic component, a discrete gate or a transistor logic component, or a discrete hardware component. The processor 1003 may implement or perform the methods, steps, and logical block diagrams that are disclosed in embodiments of this application. The general-purpose processor may be a microprocessor, or the processor may be any conventional processor or the like. Steps of the methods disclosed with reference to embodiments of this application may be directly performed and completed by using a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 1004, and the processor 1003 reads information in the memory 1004, and completes the steps in the foregoing method in combination with hardware of the processor 1003.

In at least one embodiment of this application, the processor 1003 is configured to perform the report information sending method performed by the policy control network element.

In another possible design, when the first session management network element and the policy control network element are chips, the chips each include a processing unit and a communication unit. The processing unit may be, for example, a processor, and the communication unit may be, for example, an input/output interface, a pin, or a circuit. The processing unit may execute computer-executable instructions stored in a storage unit, so that the chip in the terminal performs the report information sending method according to any one of the possible implementations of the first aspect. Optionally, the storage unit is a storage unit in the chip, for example, a register or a buffer, or the storage unit may be a storage unit in the terminal but outside the chip, for example, a read-only memory (read-only memory, ROM), another type of static storage device capable of storing static information and instructions, or a random access memory (random access memory, RAM).

The processor mentioned anywhere above may be a general-purpose central processing unit, a microprocessor, an ASIC, or one or more integrated circuits configured to control program execution of the methods. In some embodiments, at least one of a user plane network element, a second session management network element, an intermediate session management network element, a first access network element, a second access network element, a local network exposure function network element, or an application function network element has a configuration similar to that described with respect to FIG. 9 or 10.

In addition, it should be noted that the apparatus embodiments described above are merely examples. The units described as separate parts may or may not be physically separate, and parts displayed as units may or may not be physical units, that is, may be located in one position, or may be distributed on a plurality of network units. Some or all the modules may be selected according to actual needs to achieve the objectives of the solutions of embodiments. In addition, in the accompanying drawings of the apparatus embodiments provided in this application, connection relationships between modules indicate that the modules have communication connections with each other, which may be specifically implemented as one or more communication buses or signal cables.

Based on the descriptions of the foregoing implementations, a person skilled in the art may clearly understand that this application may be implemented by using software in addition to necessary universal hardware, or by using dedicated hardware, including a dedicated integrated circuit, a dedicated CPU, a dedicated memory, a dedicated component, and the like. Generally, any function that is performed by a computer program can be easily implemented by using corresponding hardware. Moreover, a specific hardware structure used to achieve a same function may be of various forms, for example, in a form of an analog circuit, a digital circuit, or a dedicated circuit. However, for this application, software program implementation is a better implementation in most cases. Based on such an understanding, the technical solutions in this application essentially or the part contributing to the prior art may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a server, a network device, or the like) to perform the methods in embodiments of this application.

All or some of the foregoing embodiments may be implemented by using software, hardware, firmware, or any combination thereof. When the software is used to implement embodiments, embodiments may be implemented completely or partially in a form of a computer program product.

The computer program product includes one or more computer instructions. When the computer program instructions are loaded and executed on a computer, the procedure or functions according to embodiments of this application are all or partially generated. The computer may be a general-purpose computer, a special-purpose computer, a computer network, or another programmable apparatus. The computer instructions may be stored in the computer-readable storage medium or may be transmitted from one computer-readable storage medium to another computer-readable storage medium. For example, the computer instructions may be transmitted from a website, a computer, a server, or a data center to another website, another computer, another server, or another data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

What is claimed is:

1. A report information sending method, comprising:
receiving, by a first session management network element, first report information from a user plane network element, wherein the first report information comprises first indication information and an identifier of a first alternative quality of service (QOS) profile, and the first indication information indicates that a QoS requirement of a first QoS flow cannot be guaranteed; and
sending, by the first session management network element, second report information directly to an application function network element, wherein the second report information comprises second indication information and an identifier of a first alternative service requirement, the identifier of the first alternative service requirement corresponds to the identifier of the first alternative QoS profile, the second indication information indicates that a QOS requirement of a first service data flow cannot be guaranteed, the first QoS flow is configured to transmit the first service data flow, and the first service data flow is a service data flow of an application corresponding to the application function network element, wherein, before the receiving, by the first session management network element, the first report information from the user plane network element, the method further comprises:
receiving, by the first session management network element, a first policy from a second session management network element, wherein
the first policy comprises an identifier of the first QoS flow, first QoS notification control indication information, at least one alternative QoS profile, information about a notification endpoint of the application function network element, and an identifier that is of at least one alternative service requirement and that corresponds to an identifier of the at least one alternative QoS profile,
the at least one alternative QoS profile comprises the first alternative QoS profile,
the identifier of the at least one alternative service requirement comprises the identifier of the first alternative service requirement, and
the first QoS notification control indication information indicates to send indication information indicating that the QoS requirement of the first QoS flow cannot be guaranteed; and
either
determining, by the first session management network element, a second policy according to the first policy, and sending, by the first session management network element, the second policy to a first access network element, wherein the second policy comprises the identifier of the first QoS flow, second QoS notification control indication information, and the at least one alternative QoS profile, and the second QoS notification control indication information is determined based on the first QoS notification control indication information, or
determining, by the first session management network element, a third policy according to the first policy, and sending, by the first session management network element, the third policy to the user plane network element, wherein the third policy indicates the user plane network element to send indication information indicating whether the QoS requirement of the first QoS flow can be guaranteed.

2. The method according to claim 1, wherein
the first session management network element, the user plane network element and the application function network element are deployed in a local data center, and
the second session management network element is deployed outside the local data center.

3. The method according to claim 1, wherein the second indication information is determined based on the first indication information.

4. The method according to claim 1, wherein
the first session management network element is an intermediate session management network element,
the method comprises:
the determining, by the first session management network element, the second policy according to the first policy, and the sending, by the first session management network element, the second policy to the first access network element, and
the method further comprises:
receiving, by the first access network element, the second policy from the first session management network element;

sending, by the first access network element and in accordance with the second QoS notification control indication information included in the second policy, the first indication information, which indicates that the QoS requirement of the first QoS flow cannot be guaranteed, to the user plane network element; and
sending, by the user plane network element, the first report information, which includes the first indication information, to the first session management network element.

5. The method according to claim 1, wherein
the first session management network element is an intermediate session management network element,
the method comprises:
the determining, by the first session management network element, the third policy according to the first policy, and the sending, by the first session management network element, the third policy to the user plane network element, and
the method further comprises:
receiving, by the user plane network element, the third policy from the first session management network element;
determining, by the user plane network element and in accordance with the third policy, whether the QoS requirement of the first QoS flow can be guaranteed; and
in response to determining, by the user plane network element, that the QoS requirement of the first QoS flow cannot be guaranteed, sending, by the user plane network element, the first report information, which includes the first indication information indicating that the QoS requirement of the first QoS flow cannot be guaranteed, to the first session management network element.

6. The method according to claim 1, wherein
the first indication information comprises the identifier of the first QoS flow, and
the sending, by the first session management network element, the second report information directly to the application function network element comprises:
determining, by the first session management network element, the notification endpoint of the application function network element based on the identifier of the first QoS flow, and
sending, by the first session management network element, the second report information directly to the application function network element by using the notification endpoint of the application function network element.

7. The method according to claim 1, wherein the method further comprises:
sending, by a policy control network element, a fourth policy to the second session management network element, wherein the fourth policy comprises at least one alternative QoS parameter set and the identifier that is of the at least one alternative service requirement and that corresponds to an identifier of the at least one alternative QoS parameter set;
receiving, by the second session management network element, the fourth policy from the policy control network element; and
generating, by the second session management network element, the first policy according to the fourth policy, wherein
the at least one alternative QoS parameter set determines the at least one alternative QoS profile, the identifier that is of the at least one alternative service requirement and that corresponds to the identifier of the at least one alternative QoS parameter set determines the identifier that is of the at least one alternative service requirement and that corresponds to the identifier of the at least one alternative QoS profile, and the identifier of the at least one alternative service requirement comprises the identifier of the first alternative service requirement.

8. The method according to claim 7, wherein
the first session management network element, the user plane network element and the application function network element are deployed in a local data center, and
the second session management network element and the policy control network element are deployed outside the local data center.

9. A communication system, comprising:
a user plane network element;
a first session management network element;
a second session management network element;
an application function network element; and
a first access network element, wherein
the first session management network element is configured to:
  receive first report information from the user plane network element, wherein the first report information comprises first indication information and an identifier of a first alternative quality of service (QOS) profile, and the first indication information indicates that a QoS requirement of a first QoS flow cannot be guaranteed; and
  send second report information directly to the application function network element, wherein the second report information comprises second indication information and an identifier of a first alternative service requirement, the identifier of the first alternative service requirement corresponds to the identifier of the first alternative QoS profile, the second indication information indicates that a QoS requirement of a first service data flow cannot be guaranteed, the first QoS flow is configured to transmit the first service data flow, and the first service data flow is a service data flow of an application corresponding to the application function network element; and
before receiving the first report information from the user plane network element, the first session management network element is further configured to:
receive a first policy from the second session management network element, wherein
  the first policy comprises an identifier of the first QoS flow, first QoS notification control indication information, at least one alternative QoS profile, information about a notification endpoint of the application function network element, and an identifier that is of at least one alternative service requirement and that corresponds to an identifier of the at least one alternative QoS profile,
  the at least one alternative QoS profile comprises the first alternative QoS profile,
  the identifier of the at least one alternative service requirement comprises the identifier of the first alternative service requirement, and
  the first QoS notification control indication information indicates to send indication information indicating that the QoS requirement of the first QoS flow cannot be guaranteed; and
either
  determine a second policy according to the first policy and send the second policy to the first access network element, wherein the second policy comprises the identifier of the first QoS flow, second QoS notification control indication information, and the at least one alternative QoS profile, and the second QoS notification control indication information is
  determined based on the first QoS notification control indication information, or determine a third policy according to the first policy and send the third policy to the user plane network element, wherein the third policy indicates the user plane network element to send indication information indicating whether the QoS requirement of the first QoS flow can be guaranteed.

10. The communication system according to claim 9, wherein
the first session management network element, the user plane network element and the application function network element are deployed in a local data center, and
the second session management network element is deployed outside the local data center.

11. The communication system according to claim 9, wherein the second indication information is determined based on the first indication information.

12. The communication system according to claim 9, wherein
the first session management network element is an intermediate session management network element,
the first session management network element is configured to:
  determine the second policy according to the first policy and send the second policy to the first access network element,
the first access network element is configured to:
  receive the second policy from the first session management network element, and
  in accordance with the second QoS notification control indication information included in the second policy, send the first indication information, which indicates that the QoS requirement of the first QoS flow cannot be guaranteed, to the user plane network element, and
the user plane network element is configured to:
  send the first report information, which includes the first indication information, to the first session management network element.

13. The communication system according to claim 9, wherein
the first session management network element is an intermediate session management network element,
the first session management network element is configured to:
  determine the third policy according to the first policy and send the third policy to the user plane network element, and
the user plane network element is configured to:
  receive the third policy from the first session management network element, determine, in accordance with the third policy, whether the QoS requirement of the first QoS flow can be guaranteed, and in response to determining that the QoS requirement of the first QoS flow cannot be guaranteed, send the first report information, which includes the first indication information indicating that the QoS requirement of the first QoS flow cannot be guaranteed, to the first session management network element.

14. The communication system according to claim 9, wherein the first indication information comprises the identifier of the first QoS flow, and the first session management network element is configured to:

determine the notification endpoint of the application function network element based on the identifier of the first QoS flow, and send the second report information directly to the application function network element by using the notification endpoint of the application function network element.

15. The communication system according to claim 9, further comprising:

a policy control network element configured to:

send a fourth policy to the second session management network element, wherein the fourth policy comprises at least one alternative QoS parameter set and the identifier that is of the at least one alternative service requirement and that corresponds to an identifier of the at least one alternative QoS parameter set, wherein the second session management network element is configured to receive the fourth policy from the policy control network element, and generate the first policy according to the fourth policy, wherein the at least one alternative QoS parameter set determines the at least one alternative QoS profile, the identifier that is of the at least one alternative service requirement and that corresponds to the identifier of the at least one alternative QoS parameter set determines the identifier that is of the at least one alternative service requirement and that corresponds to the identifier of the at least one alternative QoS profile, and the identifier of the at least one alternative service requirement comprises the identifier of the first alternative service requirement.

16. The communication system according to claim 15, wherein the first session management network element, the user plane network element and the application function network element are deployed in a local data center, and the second session management network element and the policy control network element are deployed outside the local data center.

17. A report information sending method, comprising:

receiving, by a first session management network element, first report information from a user plane network element, wherein the first report information comprises first indication information and an identifier of a first alternative quality of service (QOS) profile, and the first indication information indicates that a QoS requirement of a first QoS flow cannot be guaranteed; and sending, by the first session management network element, second report information to an application function network element, wherein the second report information comprises second indication information and an identifier of a first alternative service requirement, the identifier of the first alternative service requirement corresponds to the identifier of the first alternative QoS profile, the second indication information indicates that a QoS requirement of a first service data flow cannot be guaranteed, the first QoS flow is configured to transmit the first service data flow, and the first service data flow is a service data flow of an application corresponding to the application function network element, wherein, before the receiving, by the first session management network element, the first report information from the user plane network element, the method further comprises:

receiving, by the first session management network element, a first policy from a second session management network element, wherein the first policy comprises an identifier of the first QoS flow, first QoS notification control indication information, at least one alternative QoS profile, information about a notification endpoint of a local network exposure function network element, and an identifier that is of at least one alternative service requirement and that corresponds to an identifier of the at least one alternative QoS profile, the at least one alternative QoS profile comprises the first alternative QoS profile, the identifier of the at least one alternative service requirement comprises the identifier of the first alternative service requirement, and the first QoS notification control indication information indicates to send indication information indicating that the QoS requirement of the first QoS flow cannot be guaranteed; and either determining, by the first session management network element, a second policy according to the first policy, and sending, by the first session management network element, the second policy to a first access network element, wherein the second policy comprises the identifier of the first QoS flow, second QoS notification control indication information, and the at least one alternative QoS profile, and the second QoS notification control indication information is determined based on the first QoS notification control indication information, or determining, by the first session management network element, a third policy according to the first policy, and sending, by the first session management network element, the third policy to the user plane network element, wherein the third policy indicates the user plane network element to send indication information indicating whether the QoS requirement of the first QoS flow can be guaranteed.

18. The method according to claim 17, wherein the first indication information comprises the identifier of the first QoS flow, and the sending, by the first session management network element, the second report information to the application function network element comprises:

determining, by the first session management network element, the notification endpoint of the local network exposure function network element based on the identifier of the first QoS flow, and sending, by the first session management network element, the second report information directly to the local network exposure function network element by using the notification endpoint of the local network exposure function network element, wherein the second report information is sent by the local network exposure function network element to the application function network element.

19. The method according to claim 18, wherein
the first session management network element, the user plane network element, the application function network element and the local network exposure function network element are deployed in a local data center, and
the second session management network element is deployed outside the local data center.

20. The method according to claim 18, wherein the method further comprises:
sending, by a policy control network element, a fourth policy to the second session management network element, wherein the fourth policy comprises at least one alternative QoS parameter set and the identifier that is of the at least one alternative service requirement and that corresponds to an identifier of the at least one alternative QoS parameter set;
receiving, by the second session management network element, the fourth policy from the policy control network element; and
generating, by the second session management network element, the first policy according to the fourth policy, wherein
the at least one alternative QoS parameter set determines the at least one alternative QoS profile,
the identifier that is of the at least one alternative service requirement and that corresponds to the identifier of the at least one alternative QoS parameter set determines the identifier that is of the at least one alternative service requirement and that corresponds to the identifier of the at least one alternative QoS profile, and
the identifier of the at least one alternative service requirement comprises the identifier of the first alternative service requirement, wherein
the first session management network element, the user plane network element, the application function network element and the local network exposure function network element are deployed in a local data center, and
the second session management network element and the policy control network element are deployed outside the local data center.

21. A device, comprising:
a processor; and
a computer readable storage medium storing a computer program for execution by the processor, the computer program including instructions to cause the device to perform:
receiving first report information from a user plane network element, wherein the first report information comprises first indication information and an identifier of a first alternative quality of service (QOS) profile, and the first indication information indicates that a QoS requirement of a first QoS flow cannot be guaranteed; and
sending second report information directly to an application function network element, wherein the second report information comprises second indication information and an identifier of a first alternative service requirement, the identifier of the first alternative service requirement corresponds to the identifier of the first alternative QoS profile, the second indication information indicates that a QoS requirement of a first service data flow cannot be guaranteed, the first QoS flow is configured to transmit the first service data flow, and the first service data flow is a service data flow of an application corresponding to the application function network element,
wherein, before the receiving the first report information from the user plane network element, the device is further caused to perform:
receiving a first policy from a second session management network element, wherein
the first policy comprises an identifier of the first QoS flow, first QoS notification control indication information, at least one alternative QoS profile, information about a notification endpoint of the application function network element, and an identifier that is of at least one alternative service requirement and that corresponds to an identifier of the at least one alternative QoS profile,
the at least one alternative QoS profile comprises the first alternative QoS profile,
the identifier of the at least one alternative service requirement comprises the identifier of the first alternative service requirement, and
the first QoS notification control indication information indicates to send indication information indicating that the QoS requirement of the first QoS flow cannot be guaranteed; and
either
determining a second policy according to the first policy, and sending, by the first session management network element, the second policy to a first access network element, wherein the second policy comprises the identifier of the first QOS flow, second QoS notification control indication information, and the at least one alternative QoS profile, and the second QoS notification control indication information is determined based on the first QoS notification control indication information, or
determining a third policy according to the first policy, and sending, by the first session management network element, the third policy to the user plane network element, wherein the third policy indicates the user plane network element to send indication information indicating whether the QoS requirement of the first QoS flow can be guaranteed.

* * * * *